(12) United States Patent
Kinoshita et al.

(10) Patent No.: US 7,007,553 B2
(45) Date of Patent: Mar. 7, 2006

(54) MECHANICAL QUANTITY SENSOR ELEMENT, LOAD SENSOR ELEMENT, ACCELERATION SENSOR ELEMENT, AND PRESSURE SENSOR ELEMENT

(75) Inventors: Kiyotaka Kinoshita, Kariya (JP); Shiro Kuwahara, Kariya (JP); Toshiharu Mikami, Kariya (JP); Kaori Fujita, Kariya (JP); Toshitada Wada, Kariya (JP); Mitsuru Asai, Aichi-gun (JP); Hiroaki Makino, Aichi-gun (JP); Shin Tajima, Aichi-gun (JP); Nobuo Kamiya, Aichi-gun (JP); Katsunori Yamada, Aichi-gun (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 96 days.

(21) Appl. No.: 10/415,352

(22) PCT Filed: Nov. 5, 2001

(86) PCT No.: PCT/JP01/09669

§ 371 (c)(1),
(2), (4) Date: Oct. 9, 2003

(87) PCT Pub. No.: WO02/37073

PCT Pub. Date: May 10, 2002

(65) Prior Publication Data

US 2004/0074306 A1  Apr. 22, 2004

(30) Foreign Application Priority Data

| Nov. 6, 2000 | (JP) | ............................. 2000-337809 |
| Feb. 26, 2001 | (JP) | ............................. 2001-050275 |
| Apr. 10, 2001 | (JP) | ............................. 2001-111742 |
| Apr. 17, 2001 | (JP) | ............................. 2001-118619 |
| Apr. 17, 2001 | (JP) | ............................. 2001-118620 |

(51) Int. Cl.
*G01B 7/16* (2006.01)
(52) U.S. Cl. ....................................................... 73/777
(58) Field of Classification Search ................. 73/772, 73/773, 774, 775, 777
See application file for complete search history.

(56) References Cited

U.S. PATENT DOCUMENTS

| 4,295,376 A | * | 10/1981 | Bell ............................ 73/724 |
| 5,005,414 A | | 4/1991 | Holland et al. |
| 5,186,042 A | * | 2/1993 | Miyazaki .................... 73/118.1 |
| 5,214,961 A | * | 6/1993 | Kojima et al. ................ 73/715 |
| 5,679,888 A | | 10/1997 | Tohda et al. |
| 5,869,767 A | * | 2/1999 | Hayward et al. ............. 73/774 |
| 5,989,700 A | | 11/1999 | Krivopal |

(Continued)

FOREIGN PATENT DOCUMENTS

EP  930490  7/1999

(Continued)

Primary Examiner—Max Noori
(74) Attorney, Agent, or Firm—Oblon, Spivak, McClelland, Maier & Neustadt, P.C.

(57) ABSTRACT

A dynamic quantity sensor device capable of measuring a dynamic quantity at a high precision and securing insulation of a pressure sensing body easily. This dynamic quantity sensor includes a pressure sensing body composed of composite ceramics in which a material having a pressure resistance effect is dispersed on a matrix made of an electrical insulation ceramic material and a pressure receiving body having an electrical insulation characteristic and disposed on a pressure receiving surface of the pressure receiving body, wherein the pressure sensing body and the pressure receiving body are integrated with each other.

20 Claims, 13 Drawing Sheets

U.S. PATENT DOCUMENTS

| | | | |
|---|---|---|---|
| 6,079,277 A | 6/2000 | Chung | |
| 6,474,169 B1 * | 11/2002 | Aizawa et al. | 73/715 |
| 6,534,430 B1 | 3/2003 | Makino et al. | |
| 6,584,660 B1 * | 7/2003 | Shimogawa et al. | 29/25.35 |
| 6,608,427 B1 * | 8/2003 | Akiyama et al. | 310/333 |
| 6,653,212 B1 * | 11/2003 | Yamanaka et al. | 438/485 |
| 6,825,054 B1 * | 11/2004 | Valentine et al. | 438/22 |
| 6,876,537 B1 * | 4/2005 | Takahara et al. | 361/321.2 |

FOREIGN PATENT DOCUMENTS

| | | |
|---|---|---|
| JP | 52-040793 | 3/1977 |
| JP | 62-066689 | 3/1987 |
| JP | 04-053206 | 2/1992 |
| JP | 08-188478 | 7/1996 |
| JP | 10-030908 | 2/1998 |
| JP | 2000-241263 | 9/2000 |
| JP | 2001-242019 | 9/2001 |

* cited by examiner pressure sensing body 10
pressure sensor device 1
2 elctrode
25
3 insulation covering portion

MECHANICAL QUANTITY SENSOR ELEMENT, LOAD SENSOR ELEMENT, ACCELERATION SENSOR ELEMENT, AND PRESSURE SENSOR ELEMENT

TECHNICAL FIELD

The present invention relates to the structure of a dynamic quantity sensor device for measuring a dynamic change rate in force, pressure, torque, velocity, acceleration, position, deflection, impact, weight, mass, degree of vacuum, turning moment, vibration, noise and the like.

BACKGROUND ART

Upon measuring a dynamic change rate in force, pressure, torque, velocity, acceleration, position, deflection, impact, weight, mass, degree of vacuum, turning moment, vibration, noise and the like through distortion (stress), generally, a dynamic quantity sensor device constructed using pressure resistance effect material has been widely used.

The pressure resistance effect refers to a phenomenon that electric resistance of material changes when compression stress, tensile stress, shearing stress, normal hydrostatic pressure stress is applied.

By applying a dynamic quantity to a pressure sensing body made of such a material through an insulation body from outside, electric resistance of the pressure sensing body is changed and by detecting this change, its dynamic quantity is measured.

However, a conventionally known dynamic quantity sensor device is so structured that an external dynamic quantity to be measured is applied to a dynamic quantity sensor device through an appropriate insulation body.

For the reason, when a high load is measured by applying a high pressure or the like as a dynamic quantity, a balance of load application upon an internal pressure sensing body is bad although this is not always true when the dynamic quantity is small. Therefore, an accurate dynamic quantity measurement is difficult and insulation of the pressure sensing body is also difficult to secure.

Further, installation of such a device onto a measuring system or the like so as to secure insulation for the pressure sensing body was troublesome.

Thus, a dynamic quantity sensor device capable of measuring the dynamic quantity at a high precision and easily securing insulation of the pressure sensing body has been demanded.

Further, as a composite material which constitutes a load sensor for measuring uniaxial load, an acceleration sensor device or a pressure sensor device, semiconductor silicone monocrystal, silicon carbide and the like, which are materials having a pressure resistance effect, are used conventionally.

Further, as a pressure resistance effect material, $La_{1-x}Sr_xMnO_3$ particles and the like, which is perovskite type complex oxide, have been known.

The pressure resistance effect mentioned here refers to a phenomenon that electric resistance of material changes when compression stress, tensile stress, shearing stress, normal hydrostatic pressure stress is applied.

These conventional pressure resistance effect materials have such a disadvantage that its mechanical strength is weak. Thus, when these conventional pressure resistance effect materials are used as a sensor material, a structure for protecting the sensor material is necessary and therefore, the structure of the entire sensor becomes complicated.

For the reason, developments of the load sensor device, acceleration sensor device and pressure sensor device whose pressure sensing body has a high strength and a simple structure of dynamic quantity sensor device has been demanded.

DISCLOSURE OF THE INVENTION

According to a first aspect of the present invention, there is provided a dynamic quantity sensor device comprising: a pressure sensing body composed of composite ceramic in which a material having pressure resistance effect is dispersed on a matrix made of electrical insulation ceramic material; and a pressure receiving body having electrical insulation characteristic and disposed on a pressure receiving surface of the pressure sensing body, wherein the pressure sensing body and the pressure sensing body are integrated with each other.

The dynamic quantity sensor device includes a pressure receiving body kept in a direct contact with the pressure sensing body. Thus, a dynamic quantity is applied to the pressure sensing body through the pressure receiving body and therefore, the application of the dynamic quantity on the pressure sensing body can be equalized thereby achieving an accurate measurement of the dynamic quantity.

Further, because the pressure sensing body and the pressure receiving body are integrated with each other, insulation characteristic to the pressure sensing body can be secured easily.

In the dynamic quantity sensor device having this structure, insulation to the pressure sensing body is secured by only the device main body itself and thus, when this device is installed in a measuring system or the like, particularly, no attention needs to be paid to insulation characteristic, thereby ensuring an easy usage.

Thus, according to the first aspect of the present invention, it is possible to provide the dynamic quantity sensor device capable of measuring a dynamic quantity at a high precision and securing insulation of the pressure sensing body easily.

According to a second aspect of the present invention, there is provided a load sensor device comprising: a pressure container having a pair of pressure receiving surfaces for receiving a uniaxial load; a pressure sensing body disposed within the pressure container; and liquid or gaseous pressure medium charged in the pressure container so as to cover the pressure sensing body, wherein a uniaxial load applied to the pressure receiving surface is applied to the pressure sensing body through the pressure medium as hydrostatic pressure, and the pressure sensing body is composed of composite material in which material having pressure resistance effect is dispersed on a matrix made of electrical insulation ceramic material.

The composite material constituting the pressure sensing body is composed of composite material in which the pressure resistance effect material is dispersed in the matrix. Thus, this has not high anisotropy and there is an inclination that its sensitivity is higher when hydrostatic pressure is applied than when a uniaxial load is applied. In the load sensor device, the pressure sensing body is covered with the pressure medium and a pressure container, so that hydrostatic pressure is applied to the pressure sensing body.

The pressure receiving surface is provided on the pressure container so that a uniaxial load is received by this pressure receiving surface. Consequently, hydrostatic pressure is generated by the pressure medium, so that this hydrostatic pressure is given to the pressure sensing body. As a result, the load can be measured with composite material having the above-described structure at a higher sensitivity.

According to a third aspect of the present invention, there is provided a load sensor device comprising: a cantilevered beam structure body in which an end of a beam portion having electrical insulation characteristic is held; and a pressure sensing body disposed integrally on at least part of the beam portion; wherein a free end of the beam portion is so constructed to receive a uniaxial load and the pressure sensing body is composed of composite material in which material having pressure resistance effect is dispersed on a matrix made of electrical insulation ceramics.

The load sensor device utilizes the cantilevered beam structure body and a free end thereof receives a uniaxial load so as to sense a bending stress applied to the beam portion through the pressure sensing body. In this case, by changing the structural design of the cantilevered beam structure body in various ways, a load sensor having a rated load from a small load to a large load can be constructed.

In the load sensor device, the pressure sensing body disposed integrally on the beam portion of the cantilevered beam structure is composed of composite material having the above-described structure. Consequently, a stress generated in the beam i.e. a load applied to the beam can be detected. Preferably, the pressure sensing body is disposed only in a region having a high stress generated in the beam. As a result, the sensitivity of the load sensor can be intensified.

According to a fourth aspect of the present invention, there is provided a load sensor device comprising: a dual-point supported beam structure body in which both ends of a beam portion having electrical insulation characteristic are held; and a pressure sensing body disposed integrally on at least part of the beam portion; wherein it is so constructed that a uniaxial load is applied to the central portion of the beam portion and the pressure sensing body is composed of composite material in which material having pressure resistance effect is dispersed on a matrix made of electrical insulation ceramic material.

The load sensor device utilizes the dual-point supported beam structure, so that a uniaxial load is received by the central portion thereof so as to sense a bending stress applied to the beam portion through the pressure sensing body. In this case, by changing the structural design of the dual-point supported structure in various ways, a load sensor having a rated load from a small load to a large load can be constructed.

In the load sensor device, the pressure sensing body disposed integrally on the beam portion having the dual-point supported beam structure is composed of composite material having the above-described structure. Consequently, a stress generated in the beam or a load acting on the beam can be detected. Preferably, the pressure sensing body is disposed only in a region having a high stress generated in the beam. As a result, the sensitivity of the load sensor can be raised.

According to a fifth aspect of the present invention, there is provided an acceleration sensor device comprising: a pressure sensing body composed of composite material in which material having pressure resistance effect is dispersed on a matrix made of electrical insulation ceramic material; and a mass member disposed in the vicinity of the pressure sensing body or the pressure sensing body and for increasing mass of the pressure sensing body.

In the acceleration sensor device, the pressure sensing body is composed of special composite material having the above-described structure.

That is, the material constituting the pressure sensing body is composed of composite material in which the material having pressure resistance effect is dispersed on a matrix made of electrical insulation ceramic material. Then, because the electrical insulation ceramic material constituting that matrix has a high compression strength, the strength of the entire sensor device can be intensified. For the reason, a structure in which the composite material itself receives a high acceleration (inertial force) directly can be realized.

Further, the pressure resistance effect material is dispersed in the matrix. Thus, a conductive path is formed in the matrix such that the pressure resistance effect materials are continuous, so that pressure resistance effect can be obtained by a pressure generated when an acceleration is received.

In the acceleration sensor device, the mass member is disposed on the pressure sensing body. Consequently, an inertial force received by the pressure sensing body is increased by mass of the mass member thereby increasing the sensitivity of the pressure sensing body. For the reason, measuring accuracy of the acceleration can be improved.

As described above, according to the fifth aspect, it is possible to provide an acceleration sensor device having an excellent strength of its pressure sensing body and a simple structure.

According to a sixth aspect of the present invention, there is provided a pressure sensor device comprising: a pressure sensing body in which material having pressure resistance effect is dispersed on a matrix made of electrical insulation ceramic material; and a pair of electrodes disposed on the pressure sensing body.

In the pressure senor device, its pressure sensing body is composed of special composite material having the above-described structure.

That is, the material constituting the pressure sensing body is composed of composite material in which the material having the pressure resistance effect is dispersed on a matrix made of electrical insulation ceramic material. Because the electrical insulation ceramic material constituting that matrix has a high compression strength, the strength of the entire sensor device can be intensified. For the reason, a structure in which the composite material itself receives a high pressure easily can be realized.

Further, the pressure resistance effect material is dispersed in the matrix. Thus, a conductive path is formed in the matrix such that the pressure resistance effect materials are continuous, so that a pressure resistance effect can be obtained by a pressure generated when a pressure is received. The electrode is disposed on the pressure sensing body. By disposing a lead wire or the like thereon, this can be connected easily to an external circuit for measuring the pressure resistance effect of the electrode through these.

As described above, according to the sixth aspect, it is possible to provide a pressure sensor device having an excellent strength of its pressure sensing body and a simple structure.

According to a seventh aspect of the present invention, there is provided a pressure sensor device comprising: a diaphragm having electrical insulation characteristic; a pressure sensing body disposed integrally on the surface of the diaphragm or internally; and a pair of electrodes disposed on the pressure sensing body, wherein the pressure sensing body is composed of composite material in which material having pressure resistance effect is dispersed on a matrix made of electrical insulation ceramic material.

In the pressure sensor device, its pressure sensing body adopts composite material having the above-described structure and is disposed integrally on the diaphragm. If the diaphragm is deformed when it receives a pressure to be measured, a stress is generated in the pressure sensing body. For the reason, by measuring the pressure resistance effect of the pressure sensing body, the pressure can be measured easily.

In the pressure sensor device, the pressure sensing body is disposed integrally on the surface of the diaphragm or internally. Consequently, effects can be obtained that the pressure sensing body can be provided only on a high pressure portion, so that the sensitivity of the sensor device can be intensified.

BRIEF DESCRIPTION OF THE DRAWINGS

FIG. 6b is a sectional view taken along the line A—A of FIG. 6a.

FIG. 7b is a sectional view taken along the line B—B of FIG. 7a.

FIG. 8b is a sectional view taken along the line C—C of FIG. 8a.

FIG. 9b is a sectional view taken along the line D—D of FIG. 9a.

FIG. 10b is a sectional view taken along the line E—E of FIG. 10a.

FIG. 14b is a sectional view taken along the line A—A of FIG. 14a.

FIG. 17b is a perspective view taken along the line A—A of FIG. 17a.

FIG. 18b is a sectional view taken along the line B—B of FIG. 18a.

BEST MODE FOR CARRYING OUT THE INVENTION

Figure 1:
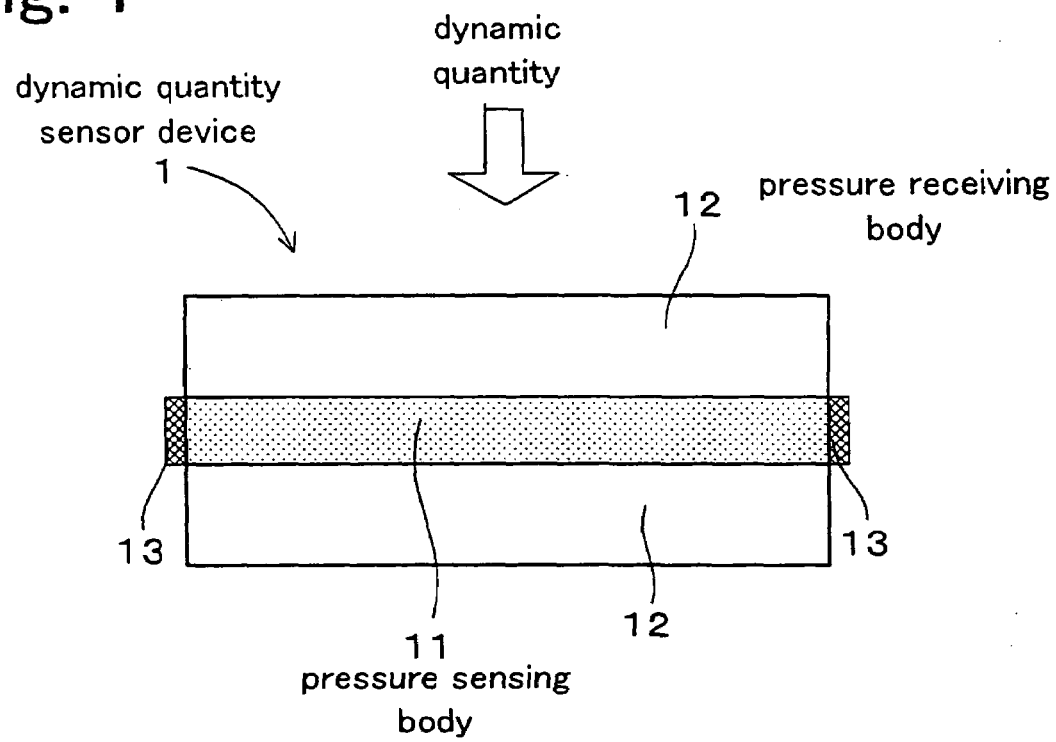
FIG. 1 is an explanatory diagram showing a dynamic quantity sensor device according to an embodiment 1.

According to a first aspect of the present invention, the aforementioned pressure receiving body is preferred to be an electric insulation ceramics. Particularly, as the pressure receiving body, the ones having following materials can be used as well as zirconia, which will be described later.

That is, it is permissible to employ $Al_2O_3$, $MgAl_2O_4$, $SiO_2$, $3Al_2O_3$, $2SiO_2$, $Y_2O_3$, $CeO_2$, $La_2O_3$, $Si_3N_4$ and the like.

Further, it is necessary to provide the pressure sensing body with an electrode. As the electrode, it is permissible to use Ag, Au, Pt, Al, Ni, Cu and the like.

Upon manufacturing the dynamic quantity sensor device, its pressure sensing body can be produced through such a process as powder molding using a doctor blade, extrusion, printing (screen printing, transfer or the like) and a mold press. Further, the pressure receiving body can be produced though such a process as powder molding using the doctor blade, extrusion, and mold press.

The pressure sensing body and the pressure receiving body can be produced through the same process or through different processes.

The pressure receiving body is preferred to be sintered integrally with the pressure sensing body.

Consequently, the sintering process of the pressure receiving body and the sintering process of the pressure sensing body can be integrated so as to execute that manufacturing process thereby rationalizing the process. Further, the pressure receiving body and the pressure sensing body can be integrated by sintering ceramic components, so that a sensor device having a high strength can be obtained.

Further, the pressure receiving body can be bonded to the pressure sensing body by means of adhesive agent.

As a result, if the pressure receiving body and the pressure sensing body cannot be integrated well or the like, they can be integrated easily.

Further, as the adhesive agent, it is permissible to use organic and inorganic adhesive agent or low melting point glass made agent.

An electric insulation ceramics constituting the pressure receiving body and an electric insulation ceramics constituting the pressure sensing body are preferred to be of the same ceramics.

Consequently, the pressure receiving body and the pressure sensing body can be integrated more firmly.

The electric insulation ceramics constituting the pressure receiving body and the electric insulation ceramics constituting the pressure sensing body are preferred to be made of zirconia.

In the meantime, the zirconia described here refers to substances including such various compositions as $3Y—ZrO_2$ and $12Ce—ZrO_2$.

Because zirconia is a ceramics having a high strength used in many mechanical parts and the like, a device structured using this can be a device having a high strength.

As material having the aforementioned pressure resistance effect, it is permissible to use any one or more of perovskite structured $(Ln_{1-x}Ma_x)_{1-y}MbO_{3-z}$, layered perovskite structured $(Ln_{2-u}Ma_{1+u})_{1-v}Mb_2O_{7-w}$, Si and substance produced by adding a small amount of additional element to these (here, $0<x\leq0.5$, $0<y\leq0.2$, $0\leq z\leq0.6$, $0<u\leq1.0$, $0\leq v\leq0.2$, $0\leq w\leq1.0$, Ln: rare earth element, Ma: one or more alkaline earth element, Mb: one or more transition metal element).

Further, material having the pressure resistance effect constituting the pressure sensing body is preferred to be $La_{1-x}Sr_xMnO_3$ particle ($0<x\leq0.5$)

Consequently, it is possible to form a pressure sensing body having a large pressure resistance change rate and a flat temperature resistance change rate.

Here, the $(Ln_{1-x}Ma_x)_{1-y}MbO_{3-z}$ has such a fear that if x exceeds 0 or 0.5, no pressure resistance effect is produced or even if such an effect is generated, it is not a sufficient pressure resistance effect.

In the $(Ln_{1-x}Ma_x)_{1-y}MbO_{3-z}$, y indicates A site loss amount having the perovskite structure. If $0\leq y\leq0.2$, the pressure resistance effect material within the composition range can exert an appropriate pressure resistance effect when the aforementioned compound material is formed.

If y exceeds 0.2, the pressure resistance effect may decrease. If oxygen loss amount z is in a range of $0\leq z\leq0.6$, $(Ln_{1-x}Ma_x)_{1-y}MbO_{3-z}$ produces an appropriate pressure resistance effect, so as to form the aforementioned compound material capable of forming an excellent pressure sensing body. If z exceeds 0.6, there is a fear that no pressure resistance effect is produced or even if it is produced, it is not a sufficient pressure resistance effect.

Further, if u is equal to 0 or 1.0, there is a fear that the $(Ln_{2-u}Ma_{1+u})_{1-v}Mb_2O_{7-w}$ may produce no pressure resistance effect or even if it produces that effect, it may not be a sufficient pressure resistance effect.

If $0\leq y\leq0.2$, the $(Ln_{2-u}Ma_{1+u})_{1-v}Mb_2O_{7-w}$ can produce an appropriate pressure resistance effect capable of forming an excellent aforementioned compound material.

If v exceeds 0.2, there is such a fear that no pressure resistance effect is produced or even if such an effect is produced, it is not a sufficient pressure resistance effect.

Further, if oxygen loss amount w is $0\leq w\leq1.0$, it is possible to form the aforementioned compound material as an excellent pressure sensing body capable of producing an appropriate pressure resistance effect.

If z exceeds 1.0, there is such a fear that no pressure resistance effect is produced or even if such an effect is produced, it is not a sufficient pressure resistance effect.

The pressure receiving body is preferred to be produced by mixing material having the pressure resistance effect in an extent that no electric conductivity is manifested. In this case, it comes that the material having the pressure resistance effect is contained in both the pressure sensing body and the pressure receiving body, so that a reaction between the pressure sensing body and the pressure receiving body is suppressed. Consequently, sintering shrinkage ratios of the pressure sensing body and the pressure receiving body are too near each other, so that distortion on an interface decreases thereby blocking deterioration due to repetition. Thus, a proper resistance value of the pressure sensing body can be manifested thereby reducing specific resistance value.

An addition amount of material having the pressure resistance effect to the pressure receiving body is preferred to be 5 to 15%. If the addition amount is less than 5%, there is such a problem that deflection reduction effect of the specific resistance value due to addition of material having the pressure resistance effect is not exerted sufficiently. On the other hand, if it exceeds 15%, there is such a problem that insulation of the pressure receiving body is difficult to secure.

As material having the aforementioned pressure resistance effect contained by the pressure receiving body, it is permissible to use any one or more of perovskite structured $(Ln_{1-x}Ma_x)_{1-y}MbO_{3-z}$, layered perovskite structured $(Ln_{2-u}Ma_{1+u})_{1-v}Mb_2O_{7-w}$, Si and substance produced by adding a small amount of additional element to these (here, $0<x\leq0.5$, $0\leq y\leq0.2$, $0\leq z\leq0.6$, $0<u\leq1.0$, $0\leq v\leq0.2$, $0\leq w\leq1.0$, Ln: rare earth element, Ma: one or more alkaline earth element, Mb: one or more transition metal element).

The material having the pressure resistance effect contained by the pressure receiving body is preferred to be (La, Sr) $MnO_3$ particle. In this case, the deflection reduction effect of the specific resistance value can be obtained easily.

If the dynamic quantity sensor device is a load sensor device capable of measuring a uniaxial load, preferably, it is so constructed that a uniaxial load to be measured is applied directly on the pressure receiving body disposed integrally on the pressure receiving surface of the pressure sensing body. Because such a load sensor device enables the pressure sensing body to directly receive the uniaxial load, the structure of the load sensor device can be simplified and changing the area of a pressure receiving surface of the pressure sensing body enables a load in a wide range from low load to high low to be measured. Further, the shape of the pressure receiving surface of the pressure sensing body can be changed easily to the shape or the like of a measuring object.

Further, as mentioned above, the compound material used as the pressure sensing body is produced by dispersing material having the pressure resistance effect on a matrix composed of the electric insulation ceramics material. Thus, as described above, the strength of the pressure sensing body is intensified, so that a high uniaxial load can be received directly. For the reason, for example, a structure capable of measuring a load of 100 Mpa or more can be obtained.

An insulating portion having electric insulation characteristic is disposed on the pressure sensing body so as to cover the entire external surface and at least part of the insulating portion can serve for the pressure receiving body at the same time. In this case, because the pressure sensing body is not exposed and the entire surface has electric insulation characteristic, no trouble occurs when the load sensor device makes a contact with a conductive member. Further, sensitivity is inclined to be raised if the entire pressure sensing body is covered with insulating portion.

A plurality of the pressure sensing body are disposed on an insulation substrate having electrical insulation characteristic with an island-like fashion by bonding one pressure receiving surf-aces of each one of the pressure sensing body to the insulation substrate, and the other pressure receiving surface of each one of the pressure sensing body has an insulating portion having electrical insulation characteristic while at least part of the insulating portion acts as the pressure receiving body. In this case, pressure distribution can be measured easily by measuring with the respective pressure sensitive bodies disposed in the island-like fashion each provided with an electrode.

Further, the shape of the pressure receiving surface can be polygonal. For example, it is permissible to apply square, hexagon, octagon or other polygonal shape.

Further, the shape of the pressure receiving surface can be produced by connecting with curves.

Further, the shape of the pressure receiving surface can be ring-like.

In any case, the shape of the pressure receiving surface can be selected corresponding to the shape of a measuring object, so that application of the load sensor device can be expanded.

The pressure receiving surface of the pressure sensing body can have the pressure receiving body of substantially sub-spherical shape. In this case, the uniaxial load can be received by a single point through the substantially semi-spherical pressure receiving body regardless of the plane configuration of a measuring object, thereby intensifying measuring precision.

In any one of the second to fourth aspect, the electric insulation ceramics constituting the pressure sensing body is preferred to be zirconia. In addition to zirconia, it is permissible to apply such ceramics as $Al_2O_3$, $MgAl_2O_4$, $SiO_2$, $3Al_2O_3$, $2SiO_2$, $Y_2O_3$, $CeO_2$, $La_2O_3$, $Si_3N_4$ as electric insulation ceramics for the matrix.

In any one of the second to fourth aspect, the material having the pressure resistance effect constituting the pressure sensing body is preferred to be composed of any one or more of perovskite structured $(Ln_{1-x}Ma_x)_{1-y}MbO_{3-z}$, layered perovskite structured $(Ln_{2-u}Ma_{1+u})_{1-v}Mb_2O_{7-w}$, Si and substance produced by adding a small amount of additional element to these (here, $0<x\leq0.5$, $0\leq y\leq0.2$, $0\leq z\leq0.6$, $0<u\leq1.0$, $0\leq v\leq0.2$, $0\leq w\leq1.0$, Ln: rare earth element, Ma: one or more alkaline earth element, Mb: one or more transition metal element).

Next, if the insulation portion is provided, it is preferred to be made of zirconia. The zirconia mentioned here includes $ZrO_2$ to which various kinds of additives are added. For example, $3Y—ZrO_2$, $12Ce—ZrO_2$ and the like are available. In the meantime, in addition to zirconia, it is permissible to apply such ceramics as $Al_2O_3$, $MgAl_2O_4$, $SiO_2$, $3Al_2O_3$, $2SiO_2$, $Y_2O_3$, $CeO_2$, $La_2O_3$, $Si_3O_4$ as the ceramics for the insulating portion.

According to the fifth aspect of the present invention, the acceleration sensor device can be so structured to have a supporting member for supporting the pressure sensing body. Consequently, a structure which makes the pressure sensing body likely to be supplied with acceleration (internal force) can be constructed of the aforementioned supporting member.

The pressure sensing body is disposed such that it is sandwiched between the supporting member and the mass member on the surface of the supporting member and further, the pressure sensing body and the mass member can be so constructed to be pressed against the supporting member when an acceleration to be measured is applied. In this case, the pressure sensing body can be structured to receive an acceleration (inertial force) directly, so that an acceleration sensor device hard to destroy and having a simple structure can be obtained.

The pressure sensing body composes a beam portion supported by the supporting member in a cantilevered beam style and its free end can be provided with the mass member. In this case, changing the shape, size and the like of the beam portion constituted by the pressure sensing body enables to correspond from a small acceleration to a large acceleration.

Next, according to the fifth aspect, the electric insulation ceramics constituting the pressure sensing body is preferred to be zirconia.

According to the fifth aspect of the present invention, the material having the pressure resistance effect constituting the pressure sensing body is preferred to be composed of any one or more of perovskite structured $(Ln_{1-x}Ma_x)_{1-y}MbO_{3-z}$, layered perovskite structured $(Ln_{2-u}Ma_{1+u})_{1-v}MbO_{7-w}$, Si and substance produced by adding a small amount of additional element to these (here, $0<x\leq0.5$, $0\leq y\leq0.2$, $0\leq z\leq0.6$, $0<u\leq1.0$, $0\leq v\leq0.2$, $0\leq w\leq1.0$ Ln: rare earth element, Ma: one or more alkaline earth element, Mb: one or more transition metal element).

Next, according to the sixth aspect of the present invention, an external surface of the pressure sensing body is preferred to have an insulation covering portion which covers it. In this case, even if a pressure environment to be measured is electric conductive, a short-circuit between the pressure sensing body and outside can be blocked by this insulation covering portion thereby making it possible to measure the pressure accurately.

Further, the shape of the pressure sensing body is preferred to be substantially cubic. In this case, production of the pressure sensing body is easy and when hydrostatic pressure is received, isotropic pressure reception can be achieved.

Next, according to the seventh aspect of the present invention, the diaphragm and the pressure sensing body may be produced integrally upon manufacturing thereof or may be produced separately and combined.

Particularly, the diaphragm and the pressure sensing body are preferred to be produced by integral sintering. In this case, the integrity between the diaphragm and the pressure sensing body is high so that deformation of the diaphragm can be transmitted securely to the pressure sensing body. In this case, the diaphragm is preferred to be composed of material of the same type as electric insulation ceramics for the pressure sensing body. Consequently, both of them can be sintered integrally easily.

In the meantime, as a method for coupling the diaphragm and the pressure sensing body together, bonding, soldering, diffusion bonding and others are available.

According to the sixth and seventh aspect of the present invention, the electric insulation ceramics constituting the pressure sensing body is preferred to be zirconia.

According to the sixth and seventh aspects, the material having the pressure resistance effect constituting the pressure sensing body is preferred to be composed of any one or more of pevrovskite structured $(Ln_{1-x}Ma_x)_{1-y}MbO_{3-z}$, layered pevroskite structured $(Ln_{2-u}Ma_{1+u})_{1-v}Mb_2O_{7-w}$, Si and substance produced by adding a small amount of additional element to these (here, $0<x\leq0.5$, $0\leq y\leq0.2$, $0\leq z\leq0.6$, $0<u\leq1.0$, $0\leq v\leq0.2$, $0\leq w\leq1.0$, Ln: rare earth element, Ma: one or more alkaline earth element, Mb: one or more transition metal element).

Hereinafter, the invention will be described further in detail with reference to the drawings.

Embodiment 1

The dynamic quantity sensor device of this embodiment includes a pressure sensing body in which material having pressure resistance effect is dispersed on a matrix composed of electric insulation ceramics material, a pressure receiving body having electric insulation characteristic composed of electric insulating ceramics disposed on a pressure receiving surface of the pressure sensing body and an electrode, these components being integrated.

As shown in FIG. 1, in the dynamic quantity sensor device 1 of this embodiment, a pair of pressure receiving bodies 12 are disposed integrally on the surface of the pressure sensing body 11 while a pair of electrodes 13 are disposed on the other surfaces of the pressure sensing body 11.

If a dynamic quantity is applied to the pressure receiving body 12 of the dynamic quantity sensor device 1 as indicated with an arrow, that dynamic quantity is transmitted to the pressure sensing body 11 so that electric resistance of the pressure sensing body 11 is changed. Measuring this change of the electric resistance through the electrodes 13 enables to measure the magnitude of the dynamic quantity.

In this embodiment, the pressure sensing body 11 is composed of $ZrO_2$ including $La_{0.75}Sr_{0.25}MnO_3$ having pressure resistance effect and 12 wt % $CeO_2$ and the pressure receiving body 12 is composed of 12 wt % $CeO_2$ added $ZrO_2$. The electrode 13 is a silver electrode.

A manufacturing method of the dynamic quantity sensor device 1 of this embodiment will be described.

As material of the pressure sensing body 11, powder produced by mixing $La_{0.75}Sr_{0.25}MnO_3$ which is a pressure resistance effect material and 12 wt % $CeO_2$ added $ZrO_2$ which is a ceramics is prepared. The mixing ratio between 12 wt % $CeO_2$ added $ZrO_2$ and $La_{0.75}Sr_{0.25}MnO_3$ is 7:3.

The aforementioned powder was mixed and crushed for four hours with a ball mill and dried to obtain mixing powder. This mixing powder and resin binder, water, and emulsifier were mixed with the ball mill or a forced agitation mixer, its slurry was adjusted and a 100 μm pressure sensing body sheet was formed according to doctor blade method.

As the material of the pressure receiving body 12, 12 wt % $CeO_2$ added $ZrO_2$ was prepared.

Like the above-mentioned method, 12 wt % $CeO_2$ added $ZrO_2$ and resin binder, water, and emulsifier were mixed with the ball mill or a forced agitation mixer, a 100 μm pressure receiving body sheet was formed according to doctor blade method.

A pressure sensing body sheet and a pressure receiving body sheet were cut out to 40 mm×40 mm and 15 pieces of the pressure receiving sheets were overlaid on each of both sides of two pressure sensing body sheets, so as to obtain a sheet layered body composed of totally 32 sheets. The respective sheets of this layered body were fused under a pressure with a hot press.

Next, the resin binder was removed by decomposition from the fused body in a degreasing furnace. After CIP (cold hydrostatic press), it was sintered at 1400° C. for four hours at a sintering furnace. Consequently, the pressure sensing body 11 and the pressure receiving body 12 were sintered integratedly. An obtained sintered body was cut into a shape of device (5 mm× 5 mm×1.5 mm).

Further, silver paste was baked on the side face (a face in which no pressure receiving body 12 exists) of the pressure sensing body 11 so as to obtain an electrode 13, so that the dynamic quantity sensor device 1 shown in FIG. 1 was obtained.

Using the dynamic quantity sensor device 1 obtained according to the manufacturing method, actually, a stress was applied thereto and its resistance change rate was measured.

Figure 2:
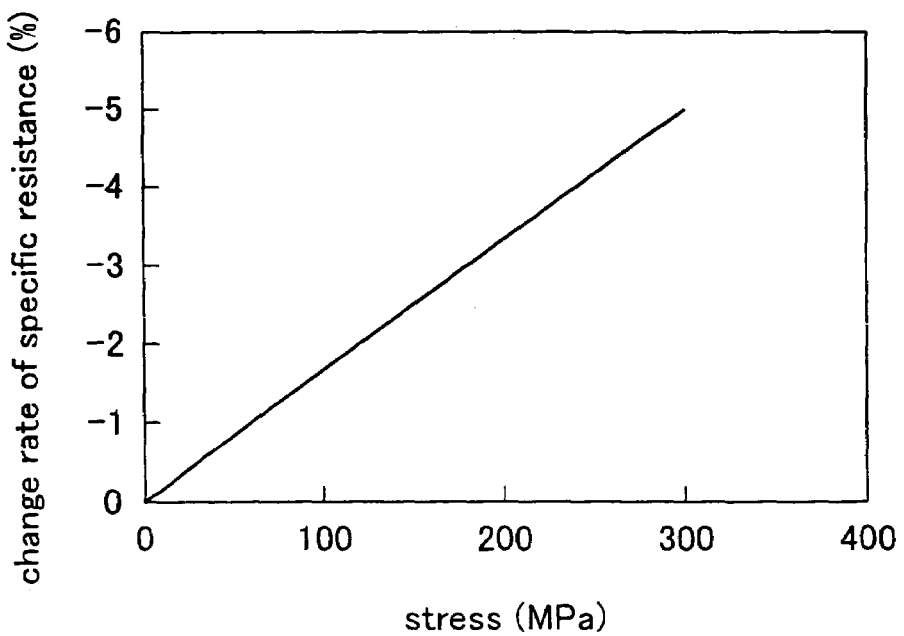
FIG. 2 is a diagram showing the relation between a stress applied to the dynamic quantity sensor device and resistance change rate in a pressure sensing body according to the embodiment 1.

FIG. 2 indicates its measurement result. In the same Figure, its abscissa axis indicates a stress applied to the pressure receiving body 12 and its ordinate axis indicates a change rate of specific resistance in the pressure sensing body 11.

This Figure indicates that in the dynamic quantity sensor device 1 of this embodiment, stress and specific resistance change rate are linearly proportional to each other up to a high stress of 300 Mpa because the pressure receiving body 12 is provided integratedly with the pressure sensing body 11.

The operation and effect of this embodiment will be described.

In the dynamic quantity sensor device 1 of this embodiment, the pressure sensing body 11 and the pressure receiving body 12 are sintered integrally so that the pressure receiving body 12 is mounted directly on the pressure sensing body 11.

Thus, because of transmission the dynamic quantity to the pressure sensing body 11 through the pressure receiving body 12, application of dynamic quantity to be measured by the pressure sensing body 11 can be equalized and the relation between the dynamic quantity applied to the pressure receiving body 12 (in this embodiment, a stress was measured) and specific resistance changes linearly under a high dynamic quantity too (see FIG. 2). Thus, an accurate measurement of the dynamic quantity is enabled. Further, insulation characteristic of the pressure sensing body can be secured easily.

In the dynamic quantity sensor device 1 of this structure, insulation to the pressure sensing body 11 is secured by only the device itself, so that when this device is installed into a measuring system or the like, its insulation characteristic does not have to be considered thereby intensifying availability.

The device in which the pressure sensing body 11 and the pressure receiving body 12 are sintered integrally can omit a process of processing the pressure receiving body 12 separately and a process of bonding the pressure sensing body 11 with the pressure receiving body 12. Therefore, manufacturing cost of the device can be lowered.

According to this embodiment, there is provided a dynamic quantity sensor device capable of measuring the dynamic quantity at a high precision and securing insulation of the pressure sensing body.

Embodiment 2

Another manufacturing method of the dynamic quantity sensor device having the same structure as the embodiment 1 will be described.

Resin binder, water and emulsifier were mixed with the same mixing powder as the embodiment 1 by agitation and extruded with an extruder so as to form the pressure sensing body sheet. The thickness of this sheet is 200 μm.

Then, 12 wt % $CeO_2$ added $ZrO_2$, resin binder, water and emulsifier were mixed with an agitation machine and extruded with the extruder so as to form a pressure receiving body sheet. The thickness of this sheet is 1.5 mm.

The pressure sensing body sheet and the pressure receiving body sheet were cut to 40 mm×40 mm and then, each piece of the pressure receiving body sheet was overlaid on each of both sides of the pressure sensing body sheet and the respective sheets were fused together with a hot press.

After that, resin binder was removed by decomposition at a degreasing furnace, CIP was executed and sintering was carried out at 1400° C. for four hours in a sintering furnace.

The pressure sensing body was cut into the shape of a device and silver paste was baked on its side face so as to create an electrode and consequently, a dynamic quantity sensor device was obtained.

Other detail matters are the same as the embodiment 1.

The dynamic quantity sensor device manufactured in this way has the same operation and effect as the embodiment 1.

Embodiment 3

Still another manufacturing method of the dynamic quantity sensor device having the same structure as the embodiment 1 will be described.

12 wt % $CeO_2$ added $ZrO_2$ and $La_{0.75}Sr_{0.25}MnO_3$ were mixed at a mixing ratio of 5:5 and this mixing powder was poured into a ball mill or a forced agitation mixer together with resin binder, water and emulsifier so as to obtain print paste for pressure sensing body.

The pressure receiving body sheet was produced by extrusion in the same way as the embodiment 2.

Then, pressure sensing body paste was printed on a single side of a pressure receiving body sheet in the thickness of 10 μm. Another piece of the pressure receiving body sheet was disposed on that and thermally compression-bonded thereto with a hot press.

After that, resin binder was removed by decomposition in a degreasing furnace, CIP was executed and sintering was carried out at 1400° C. for four hours in a sintering furnace.

Silver paste was baked on a side face of the pressure sensing body so as to form an electrode and consequently, a dynamic quantity sensor device was obtained.

Other detailed matters are the same as the embodiment 1.

The dynamic quantity sensor device manufactured in this way has the same operation and effect as the embodiment 1.

Embodiment 4

Still another manufacturing method of the dynamic quantity sensor device having the same structure as the embodiment 1 will be described.

12 wt % $CeO_2$ added $ZrO_2$ and $La_{0.75}Sr_{0.25}MnO_3$ were mixed at a mixing ratio of 8:2 and this mixing powder was formed into a thin sheet with a mold press. This formed body was subjected to the CIP and sintered at 1400° C. so as to obtain a pressure sensing body. After that, silver paste was baked on a side face of the pressure sensing body so as to form an electrode.

Further, $ZrO_2$ powder was formed into a sheet with a mold press. This formed body was subjected to CIP, and sintered at 1400° C. so as to obtain a pressure receiving body.

Then, the pressure receiving body was bonded to the both side of the pressure sensing body with epoxy adhesive (2202 made by 3M) to obtain a dynamic quantity sensor device.

Other detailed matters are the same as the embodiment 1.

The dynamic quantity sensor device manufactured in this way has the same operation and effect as the embodiment 1.

Embodiment 5

Still another manufacturing method of the dynamic quantity sensor device having the same structure as the embodiment 1 will be described.

12 wt % $CeO_2$ added $ZrO_2$ and $La_{0.75}Sr_{0.25}MnO_3$ were mixed at a mixing ratio of 8:2 to prepare mixing powder for a pressure sensing body.

As a pressure receiving body, $ZrO_2$ powder was formed with a mold press and mixing powder was formed on that formed body as a pressure sensing body. Further, $ZrO_2$ powder was pressed on that mixing powder as a pressure receiving body, so that three-layered formed body comprised of pressure receiving body, pressure sensing body and pressure receiving body (40 mm in diameter×2.4 mm in thickness) was obtained. This formed body was subjected to CIP and sintered at 1400° C. for four hours.

Then, silver paste was baked on a side face of the pressure sensing body so as to form an electrode and consequently, a dynamic quantity sensor device was obtained.

Other detailed matters are the same as the embodiment 1.

The dynamic quantity sensor device manufactured in this way has the same operation and effect as the embodiment 1.

Embodiment 6

Mixing powder for the pressure sensing body was produced in a condition that the mixing ratio between 12 wt % $CeO_2$ added $ZrO_2$ and $La_{0.75}Sr_{0.25}MnO_3$ was 8:2.

The mixing powder for the pressure sensing body was formed into 40 mm in diameter×0.8 mm in thickness with a mold press. 12 wt % $CeO_2$ added $ZrO_2$ was formed into 40 mm in diameter×0.8 mm in thickness as a pressure receiving body with a mold press.

A formed body as a pressure receiving body was disposed on both sides of the formed pressure sensing body and subjected to CIP so as to produce a 3-layered formed body. A dynamic quantity sensor device was obtained through the same process as the embodiment 5.

Other detailed matters are the same as the embodiment 1.

The dynamic quantity sensor device manufactured in this way has the same operation and effect as the embodiment 1.

Embodiment 7

This embodiment indicates an effect obtained by adding material having the pressure resistance effect to the pressure receiving body in the dynamic quantity sensor device 1 having the same structure as the embodiment 1.

In this embodiment, five kinds of the dynamic quantity sensor devices (specimen 1–5) were prepared and its specific resistance value and deflection of the specific resistance value were obtained.

$ZrO_2$ was used for base materials of the pressure receiving body 12 and the pressure sensing body 11 (FIG. 1) of this embodiment. $La_{0.75}Sr_{0.25}MnO_3$ was used for material having pressure resistance effect dispersed in the pressure sensing body 11. $La_{0.75}Sr_{0.25}MnO_3$ was dispersed by 26 weight % in the pressure sensing body 11. A conductive path was formed by dispersing by 26 weight %. $La_{0.75}Sr_{0.25}MnO_3$ was added to the pressure receiving body 12 by changing its addition amount. More specifically, as indicated by Table 1, specimen 1 was not added (0 weight %), the specimen 2 was added by 5 weight %, the specimen 3 was added by 10 weight %, the specimen 4 was added by 15 weight % and then, the specimen 4 was added by 20 weight %.

Upon manufacturing of respective specimens (dynamic quantity sensor device) of this embodiment, slurry was adjusted for both the pressure sensing body 11 and the pressure receiving body 12 so as to obtain the aforementioned mixing ratio and then, granulated powder was produced by spray dry. Next, a mold (40 mm in diameter) was filled with respective granulated powders in the order of pressure receiving body, pressure sensing body and pressure receiving body successively and these powders were pressed under a pressure of 1000 kg/cm². After that, CIP processing was carried out at 3000 kg/cm².

Next, sintering was carried out at 1400° C. for four hours in a sintering furnace. Then, the sintered body was cut and nine pieces of 5 mm×5 mm dynamic quantity sensor devices were manufactured for each specimen.

Further, Ag electrode for resistance value measurement was baked on both end faces of a device and the specimens 1–5 were obtained.

Next, the specific resistance values of the obtained specimens 1–5 and deflections of the specific resistance values were measured. The specific resistance value was measured at room temperature with a resistance meter. The deflection of the specific resistance value was evaluated based on a value obtained by dividing three times nine standard deviations by an average value. Table 1 shows a measurement result.

As indicated from Table 1, the specific resistance value of the specimen 1 is 30–50 times higher than that of the specimens 2–4 and deflection of the specific resistance value is as large as 30%. In the specimen 5, electrical conductivity is manifested in the pressure receiving body 12 and therefore, this cannot be used as a dynamic quantity sensor device.

On the other hand, the specific resistance value of the specimens 2–4 is near a specific resistance value 25 (Ωcm) of a pressure sensing body single layer and clearly, excellent deflection of specific resistance value is manifested.

Although this embodiment indicates an example in which each specimen is manufactured by mold press, the manufacturing process is not limited to any particular one but it may be manufactured by doctor blade, extrusion or printing (screen print, transfer) or a combination of these.

TABLE 1

| | adjunction of $La_{0.75}Sr_{0.25}MnO_3$ (%) | electrically conductive of pressure receiving body | specific resistance value (Ωm) | deflection of specific resistance value 3σ/ Ave % |
|---|---|---|---|---|
| specimen 1 | 0 | x | 1435 | 30 |
| specimen 2 | 5 | x | 58 | 11 |
| specimen 3 | 10 | x | 47 | 8 |
| specimen 4 | 15 | x | 37 | 7 |
| specimen 5 | 20 | ○ | — | — |

Embodiment 8

The load sensor device according to the embodiment of the present invention will be described with reference to FIGS. 3 and 4.

Figure 3:
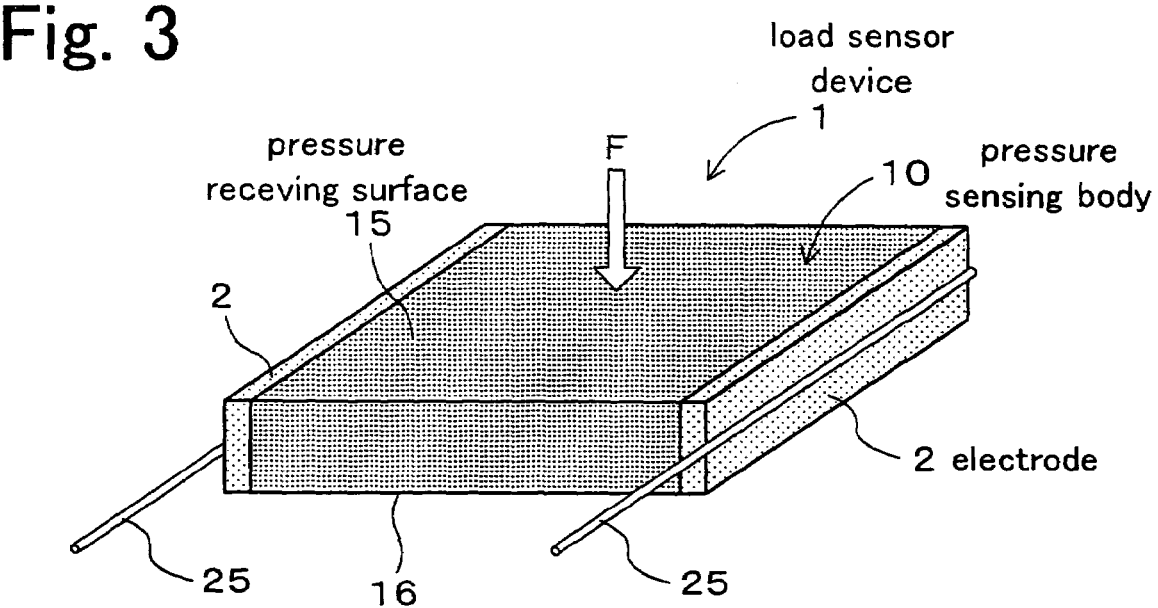
FIG. 3 is an explanatory diagram showing the structure of a load sensor device according to an embodiment 8.
Figure 4:
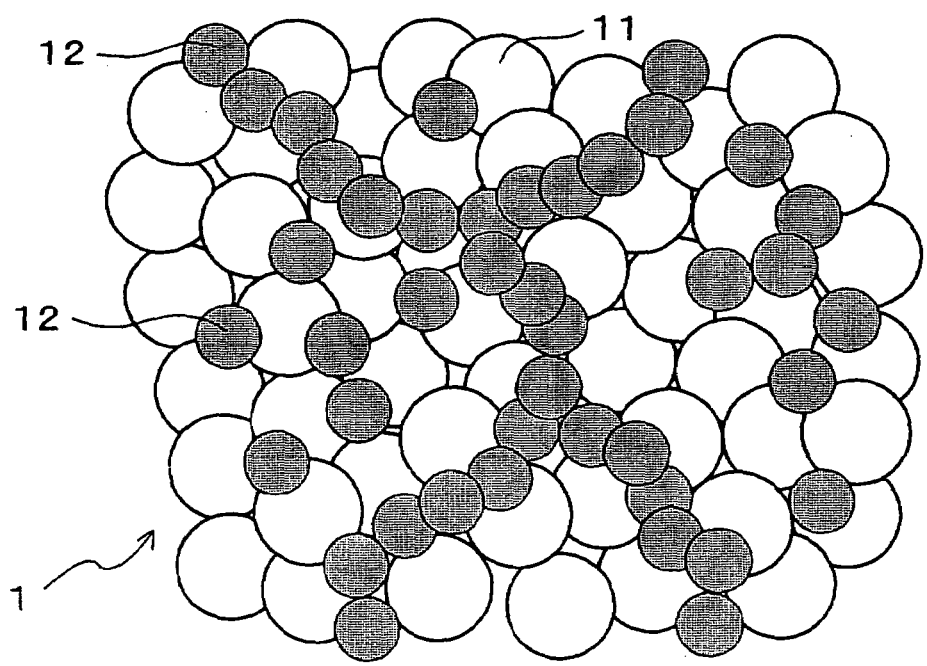
FIG. 4 is an explanatory diagram showing an internal structure of a pressure sensing body according to the embodiment 8.

The load sensor device 1 of this embodiment has a pressure sensing body 10 composed of composite material obtained by dispersing material 12 having pressure resistance effect on a matrix made of electric insulation ceramics material 11 as shown in FIGS. 3 and 4.

The pressure sensing body 10 has a pair of pressure receiving surfaces 15, 16 and is so constructed that a uniaxial load F to be measured is applied directly to the pressure receiving surfaces 15, 16.

An electrode 2 is disposed on a side face of the pressure sensing body 10. If the pressure receiving surfaces 15, 16 have a portion on which no uniaxial load F is applied, it is permissible to provide the pressure receiving surfaces 15, 16 with the electrode 2.

The pressure sensing body 10 of this embodiment is composed of composite material having the above-described specific structure. More specifically, as shown in FIG. 4, a matrix was formed using electric insulation ceramics material 11 and the material 12 having pressure resistance effect was dispersed therein. Then, the pressure resistance effect materials 12 were disposed such that they electrically continued. As shown in the same Figure, some pressure resistance effect materials 12 exist such that they are isolated and discontinuous with other pressure resistance effect materials 12.

FIG. 4 shows schematically the structure and in an actual composite material of the pressure sensing body 10, respective particles of the electric insulation ceramic material 11 and respective particles of the pressure resistance effect material 12 exist in sintering condition.

The pressure sensing body 10 composed of composite material is manufactured as follows.

As the electric insulation ceramic material 11, $ZrO_2$ to which 12 mol % $CeO_2$ is added is employed and as the pressure resistance effect material 12, $La_{0.75}Sr_{0.25}MnO_3$ is employed.

First, $La_2O_3$ powder, $SrCO_3$ powder, $MnCO_3$ powder were weighed so that composition ratio of La, Sr, Mn was 0.8:0.2:1. Those powders were thrown into a polyethylene pot together with mixing $ZrO_2$ ball and mixing solvent ethanol and mixed for 20 hours.

The mixing powder was dried and crushed and then, sintered preliminarily at 1300° C. for four hours in the atmosphere, so as to produce perovskite complex oxide powder $La_{0.75}Sr_{0.25}MnO_3$ having pressure resistance effect.

Subsequently, marketed $CeO_2$ added $ZrO_2$ powder (Sumiotmo Semento Co., Ltd., OZC-12CEB) and synthesized $La_{0.75}Sr_{0.25}MnO_3$ powder were weighed such that the weight ratio of $La_{0.75}Sr_{0.25}MnO_3$ with respect to the entire weight is 26 weight %.

These powders were thrown into a polyethylene pot together with mixing $ZrO_2$ ball, mixing solvent ethanol and mixed for four hours and dried and crushed. The crushed mixing powder was formed by pressing with a mold into a disc shape of 18 mm in diameter and after that, subjected to CIP processing under a pressure of 3000 kg/cm$^2$. Then, the formed body was sintered at 1400° for four hours.

An obtained sintered body has a density 98% as fine as its theoretical density and possesses electrical conductivity. The specific resistance of the sintered body is about 25 Ωcm.

The pressure sensing body 10 is obtained by cutting this sintered body into rectangular solids. In this pressure sensing body 10, a pair of the opposing faces are the pressure receiving surfaces 15, 16. The electrode 2 was disposed on each of a pair of side surfaces perpendicular to these pressure receiving surfaces 15, 16.

The electrode 2 was baked with Ag paste (Showa Chemical Industry Co., Ltd., H-5997) by maintaining it at 850° for 10 minutes. A lead wire 25 was disposed on the electrode 2 by soldering.

Consequently, the load sensor device 1 of this embodiment was obtained.

Next, the operation and effect of this embodiment will be described.

The load sensor device 1 of this embodiment has the pressure receiving surfaces 15, 16 provided on the pressure sensing body 10, so that the pressure sensing body 10 receives a uniaxial load to be measured directly. The pressure sensing body 10 adopts special composite material having the above-described structure.

That is, the material for the pressure sensing body 10 is composed of composite material obtained by dispersing the pressure resistance effect material 12 on a matrix of the electric insulation ceramic material 11. Because the electric insulation ceramic material 11 constituting the above matrix is composed of the zirconia and has a high compression strength, the strength of the entire sensor device can be intensified. Thus, a structure in which the composite material itself receives a high load directly can be realized easily.

Further, the pressure resistance effect material 12 is dispersed in the matrix. Thus, conductive path in which the pressure resistance effect materials 12 are disposed continuously is formed in the matrix, so that pressure resistance change effect can be obtained by applying a pressure.

Because the pressure sensing body 10 itself can receive a uniaxial load directly, the structure of the load sensor device is very simple.

When this load sensor device 1 is used actually, it only has to be disposed the pressure receiving surfaces 15 and 16 of the pressure sensing body 10 to be wedged between the measuring object, which ensures an easy usage.

Embodiment 9

Figure 5:
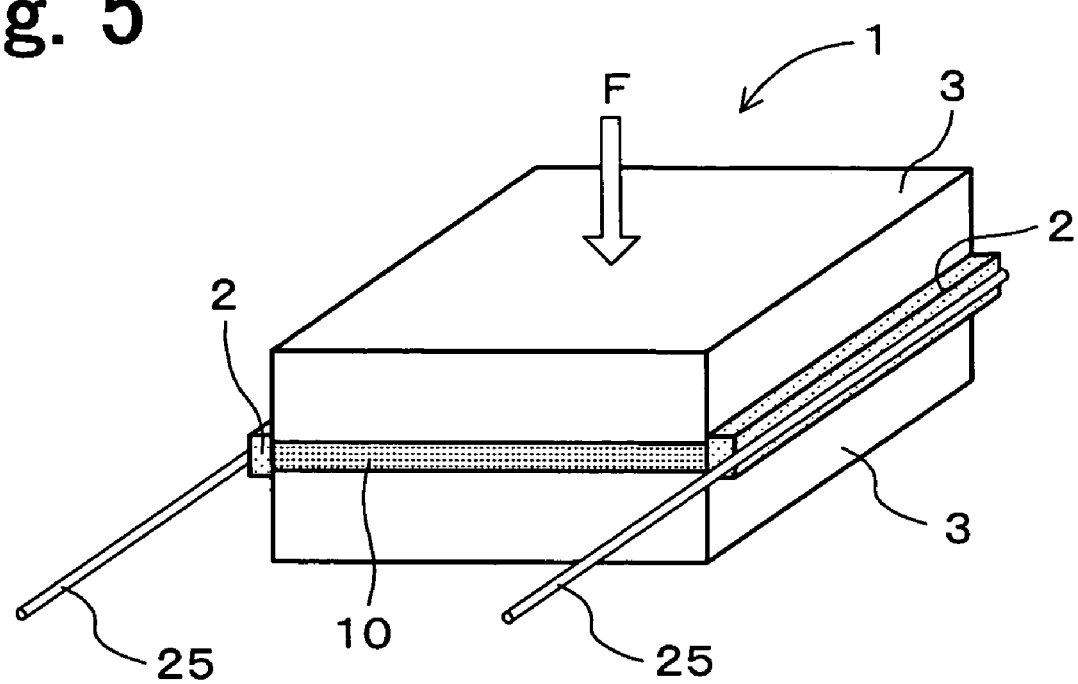
FIG. 5 is an explanatory diagram showing the structure of the load sensor device according to an embodiment 9.

As shown in FIG. 5, this embodiment employs the structure of the load sensor device 1 of the embodiment 8 as a basis and an insulating portion 3 having electrical insulation is disposed on the pressure receiving surfaces 15, 16 of the pressure receiving body 10.

This insulating portion 3 utilized the same ceramics as used on the matrix of the pressure sensing body 10 of the embodiment 8, that is, $ZrO_2$ to which 12 mol % $CeO_2$ was added. Raw material powder for the insulating portion was formed with a mold press and raw material powder for the pressure sensing body 10 was applied thereto and then pressed. Next, raw material powder for the insulating portion was applied thereon and pressed. Consequently, a three-layered formed body was obtained by pressings of three times. By sintering it integrally, a three-layered integrally sintered device was obtained. By such a procedure, a device in which the insulating portions 3 are disposed on both sides of composite material of the pressure sensing body 10 was obtained.

The other matters are the same as the embodiment 8.

In this case, even if a measuring object has electrical conductivity, electrical insulation between the measuring object and the pressure sensing body 10 can be maintained by the insulating portion 3. Therefore, an accurate load measurement is enabled. If the measuring object is not electrically conductive, it is not always necessary to provide with the insulating portion and the structure of the embodiment 8 can be adopted.

Embodiment 10

As shown in FIGS. 6a, 6b, 7a and 7b, with the structure of the load sensor device 1 of the embodiment 8 adopted as a basis, the configuration of the pressure sensing body 10, that is, the configuration of the pressure receiving surfaces 15, 16 is changed.

Figure 6A:
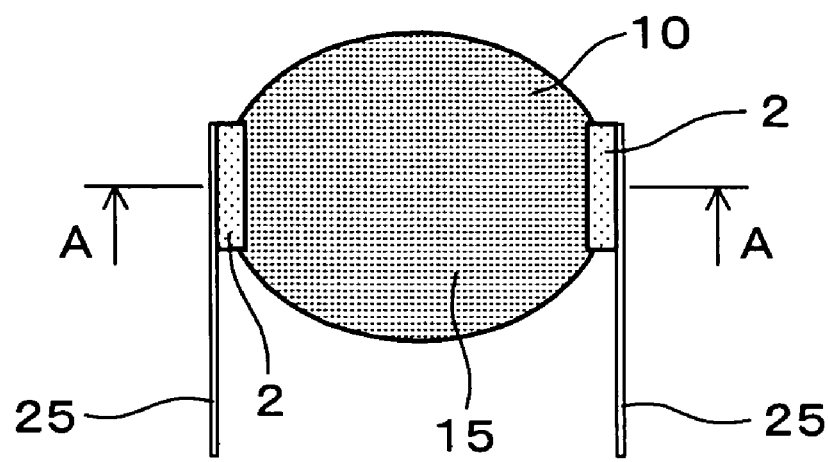
FIG. 6a is a plane view showing the structure of the load sensor device according to an embodiment 10.
Figure 6B:
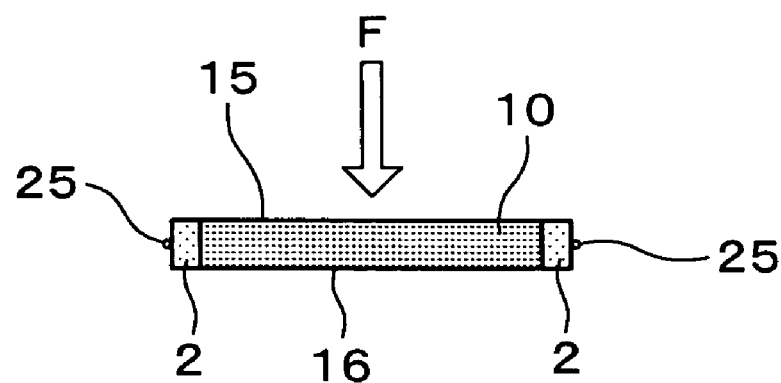

That is, the load sensor device 1 shown in FIGS. 6a and 6b indicates an example in which the shapes of the pressure receiving surfaces 15, 16 are formed by connecting with curves (elliptical in this embodiment).

Figure 7A:
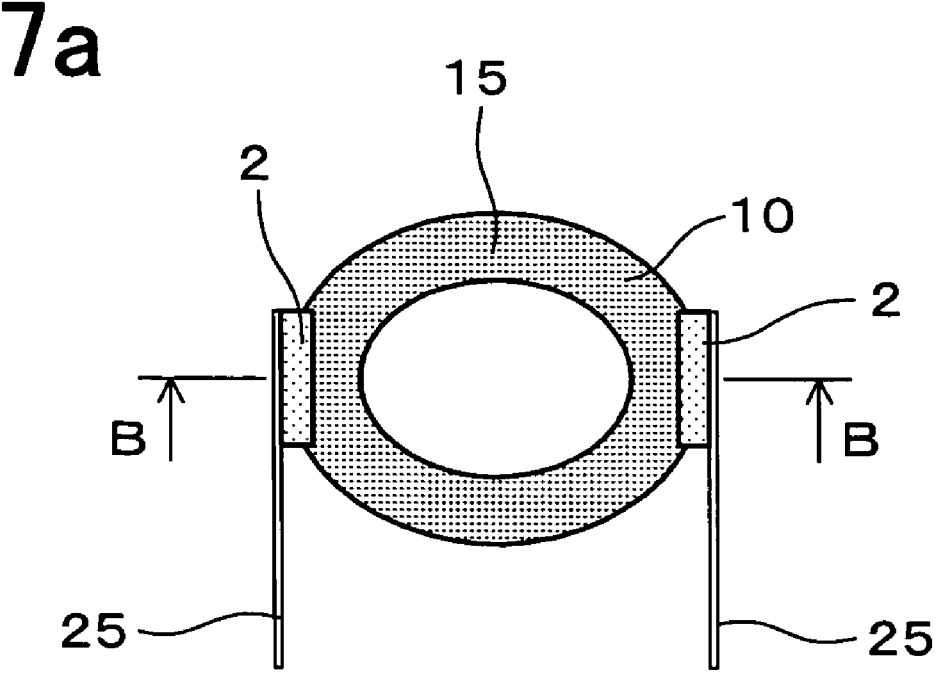
FIG. 7a is a plane view showing the structure of other load sensor device according to the embodiment 10.
Figure 7B:
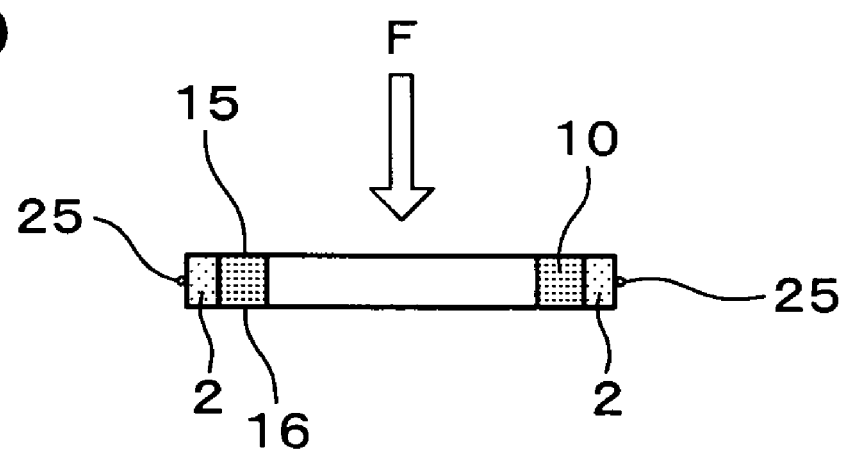

In a load sensor device 1 shown in FIGS. 7a and 7b, the shape of the pressure receiving surfaces 15, 16 is ring-like.

These are particularly effective if the shape of a contact face with the load sensor device 1 of the measuring object is elliptical, circular or ring-like. In case of the ring-like shape as shown in FIGS. 7a and 7b, if it is intended to measure a tightening strength or the like of a bolt for example, this can be disposed such that its bolt shaft is passed through a hole in the center of the pressure sensing body 10. Consequently, a bolt head can be brought into a contact with the pressure receiving surfaces 15, 16 of the pressure sensing body 10 equally, thereby intensifying measuring accuracy.

Additionally, the same operation and effect as the embodiment 8 can be obtained.

Embodiment 11

Figure 8A:
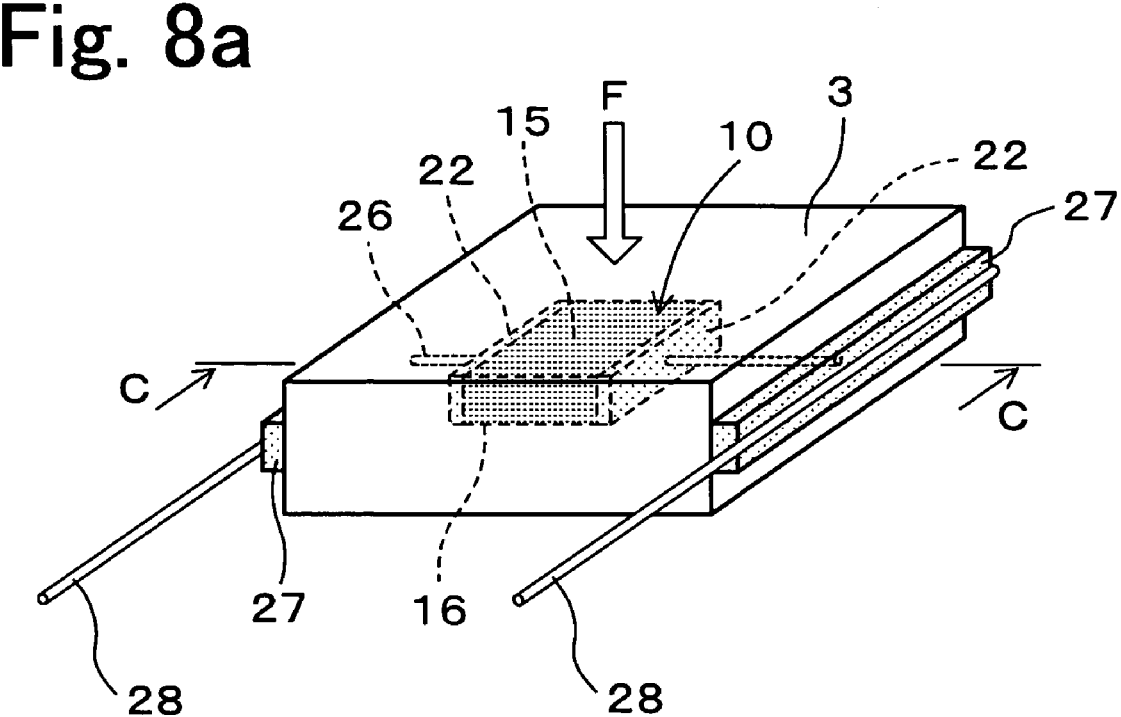
FIG. 8a is a perspective view showing the structure of the load sensor device according to an embodiment 11.
Figure 8B:
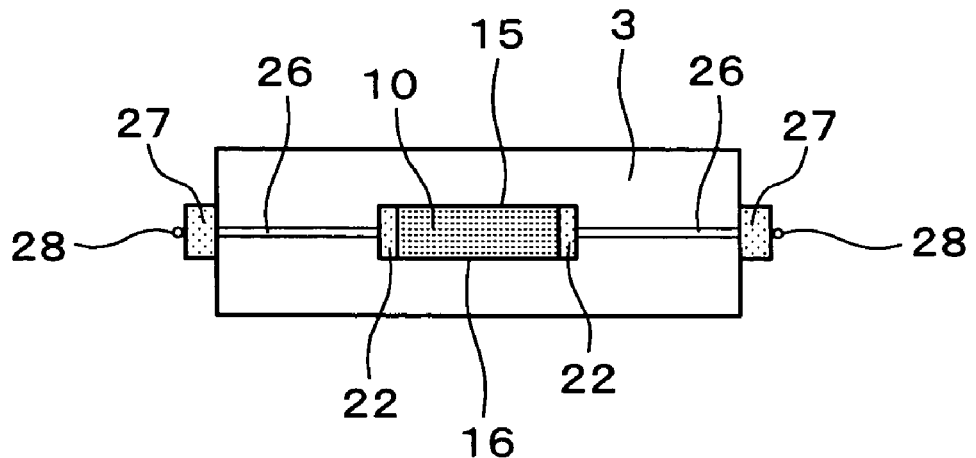

According to this embodiment, as shown in FIGS. 8a and 8b, with the structure of the load sensor device 1 of the embodiment 8 as a basis, the insulating portion 3 having electrically insulation characteristic was disposed so as to cover an entire external surface of the pressure sensing body 10.

More specifically, the pressure receiving surfaces 15, 16 are provided on the pressure sensing body 10 having the same structure as the embodiment 8 and an internal electrode 22 is disposed on side faces. Further, an internal lead wire 26 is connected to each of the internal electrodes 22. Then, all these are covered with the insulating portion 3. The internal lead wire 26 is exposed on the side face and an external electrode 27 is provided so as to be connected thereto. By connecting the lead wire 28 to this external electrode 27, the load sensor device 1 of this embodiment is produced. The other matters are the same as the embodiment 8.

In this case, because the entire pressure sensing body 10 is covered with the insulating portion 3, deformation of the pressure sensing body 10 is suppressed by the insulating portion 3 when load is applied, so that pressure sensitivity is improved.

The other effects are the same as the embodiment 8.

Embodiment 12

Figure 9A:
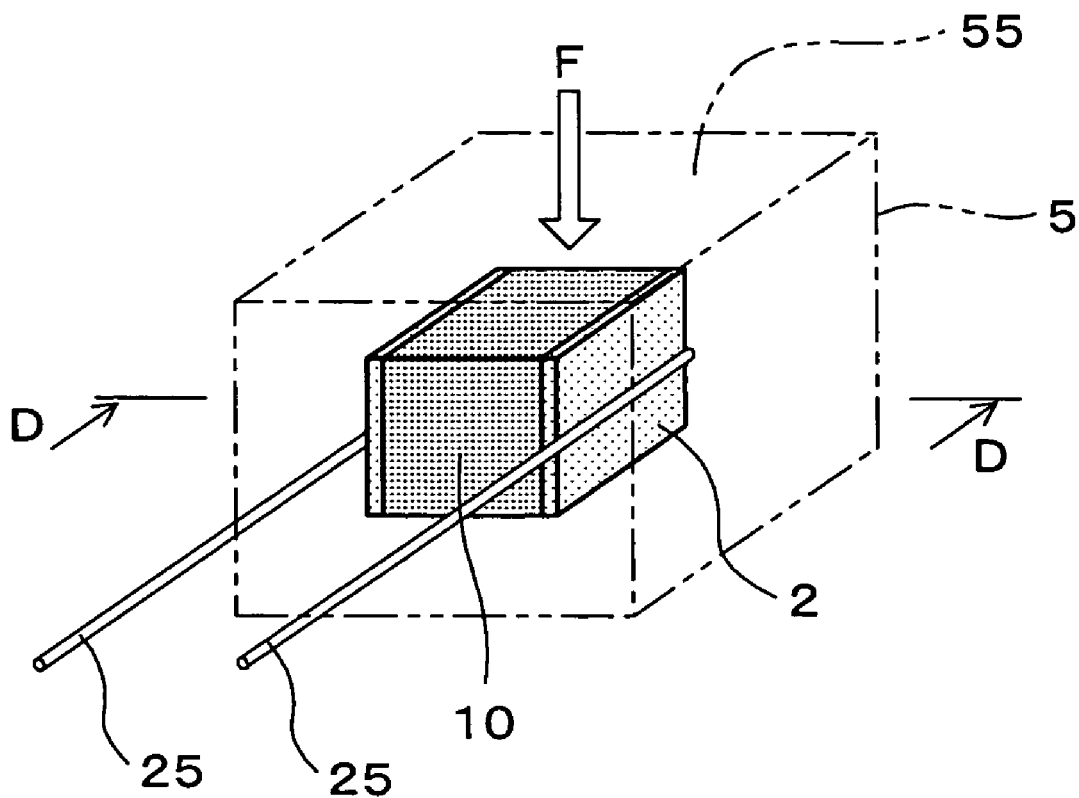
FIG. 9a is a perspective view showing the structure of the load sensor device according to an embodiment 12.
Figure 9B:
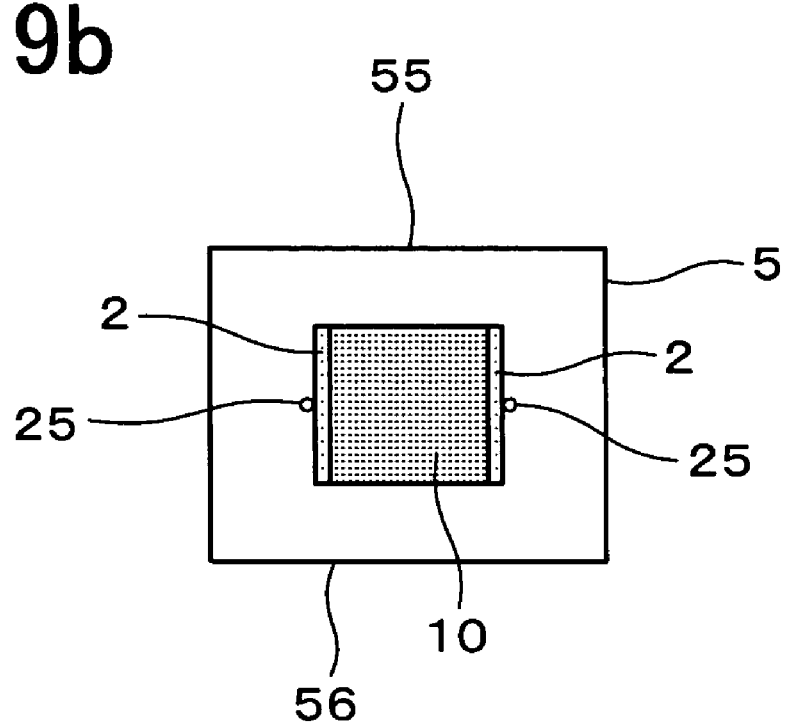

As shown in FIGS. 9a and 9b, this embodiment comprises a pressure container 5 containing a pair of pressure receiving surfaces 55, 56 for receiving a uniaxial load, a pressure sensing body 10 disposed within the pressure container 5 and pressure medium 6 charged in the pressure container 5 so as to cover the pressure sensing body 10. Then, the uniaxial load applied to the pressure receiving surfaces 55, 56 is applied to the pressure sensing body 10 through the pressure medium 6 as hydrostatic pressure.

Like the embodiment 8, the pressure sensing body 10 is composed of composite material produced by dispersing the material 12 having pressure resistance effect on a matrix made of electrical insulation ceramics material 11 as shown in FIG. 4.

The pressure container 5 was structured of metal (for example, SUS, Cu, Fe and the like). As the pressure medium 6, electrical insulation silicone oil was employed.

The electrodes 2 are disposed on side faces of the pressure sensing body 10 and the lead wires 25 were disposed such that they are protruded from the pressure container 5. The other matters are the same as the embodiment 8.

According to this embodiment, the uniaxial load applied to the pressure receiving surfaces 55, 56 of the pressure container 5 is applied to the pressure sensing body 10 through the pressure medium 6 as hydrostatic pressure. The pressure sensing body 10 is so structured to have a conductive path in a condition that the pressure resistance effect materials 12 are dispersed uniformly in a matrix, thereby ensuring a high sensitivity to hydrostatic pressure. Thus, the load sensor device 1 of this embodiment comprised of the pressure container 5 and the pressure medium 6 has a high sensitivity.

Embodiment 13

Figure 10A:
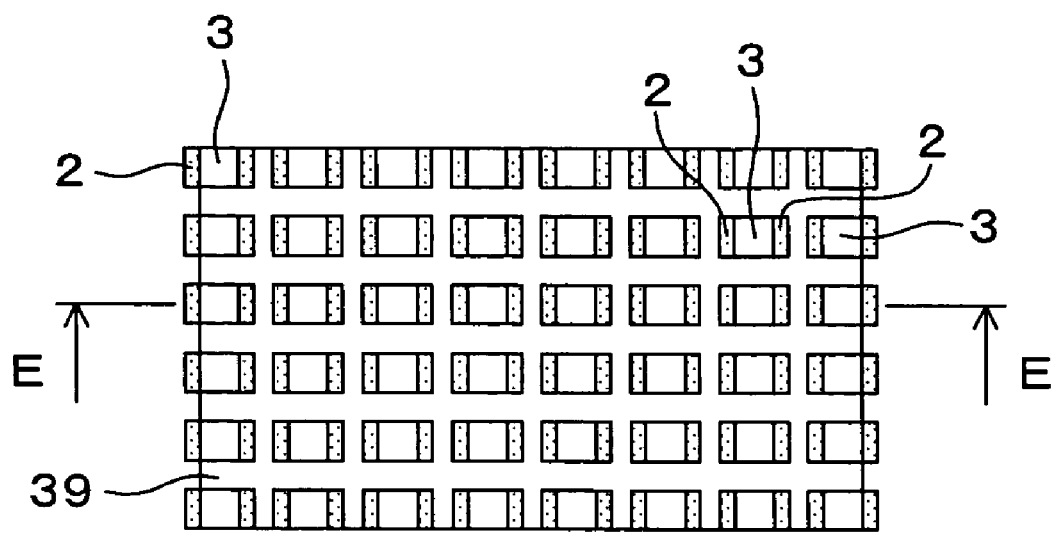
FIG. 10a is a plane view showing the structure of the load sensor device according to an embodiment 13.
Figure 10B:
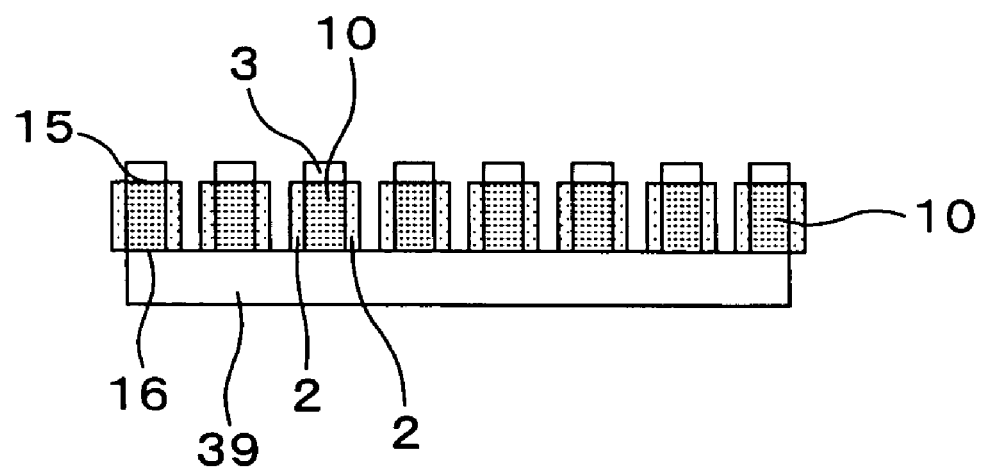

According to this embodiment, as shown in FIGS. 10a and 10b, while one pressure receiving surface 16 of each pressure sensing body 10 is bonded to an insulation substrate 39 having electrical insulation characteristic, a plurality thereof are disposed in an island-like fashion through mesh-like gap. An insulating portion 3 having electrical insulation characteristic is disposed on the other pressure receiving surface 15 of the pressure sensing body 10. The electrode 2 is disposed on each side face of each pressure sensing body 10 and a lead wire is connected thereto (not shown).

Upon manufacturing of the load sensor device 1 of this embodiment, a three-layered sheet, which includes the insulation substrate 39 as the bottom, a pressure sensing body which is an original of the pressure sensing bodies 10 as the middle, and the insulating portion 3 as the top is integrally sintered. Then, the insulating portion 3 and the pressure sensing body 10 are cut out into a grid-like fashion, so that as shown in FIG. 10a, the respective pressure sensing bodies 10 and the insulating portions 3 are separated in an island-like fashion. Then, the electrode 2 is bonded to the side face of each pressure sensing body 10 and a lead wire is connected. Consequently, the load sensor device 1 of this embodiment is obtained as shown in FIGS. 10a and 10b.

In the load sensor device 1 of this embodiment, as described above, a plurality of the pressure sensing bodies 10 are disposed separately in the island-like fashion. Thus, using this load sensor device 1 enables a uniaxial load applied to each portion making contact with each pressure sensing body 10, so that pressure distribution can be measured easily. Additionally, the same operation and effect as the embodiment 8 are obtained.

Embodiment 14

According to this embodiment, arrangement of the pressure sensing bodies 10 in the embodiment 13 is achieved by screen printing.

First, resin and emulsifier are mixed with mixing powder of zirconia powder and $La_{0.75}Sr_{0.25}MnO_3$ powder to produce slurry for the pressure sensing bodies 10. Then, this slurry is printed on a prepared insulation substrate in the island-like fashion by screen printing. Further, slurry for the insulating portion (slurry produced by mixing zirconia powder, resin and emulsifier) is printed on a top face of the pressure sensing body by screen printing.

After that, degreasing and sintering are carried out and the electrode 2 is connected to the side face of each pressure sensing body and a lead wire is connected, and consequently, the load sensor device is obtained. This load sensor device is obtained in a condition that the thickness of the pressure sensing body 10 is smaller than the load sensor device 1 (FIGS. 10a and 10b) of the embodiment 13 (not shown).

Like the embodiment 13, the load sensor device 1 of this embodiment enables the uniaxial load applied to a portion making a contact with each pressure sensing body 10 to be measured, so that pressure distribution can be measured easily.

Additionally, the same operation and effect as the embodiment 8 can be obtained.

Embodiment 15

Figure 11:
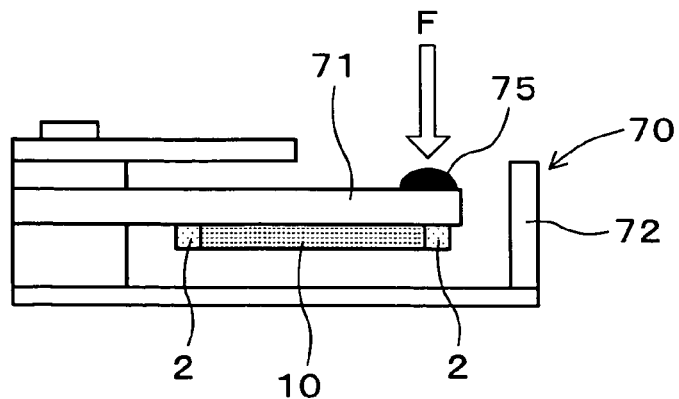
FIG. 11 is an explanatory diagram showing the structure of the load sensor device according to an embodiment 15.

This embodiment concerns a load sensor device 1, which comprises as shown in FIG. 11, a cantilevered beam structure 70 in which an end of a beam portion 71 having electrical insulation characteristic is held at an end thereof and a pressure sensing body 10 disposed at least one part of the beam portion 71 for receiving a uniaxial load provided at a free end of the beam portion 71.

Like the embodiment 8, the pressure sensing body 10 is composed of composite material obtained by dispersing the material 12 having pressure resistance effect on a matrix made of electrical insulation ceramic material 11.

As shown in FIG. 11, the beam structure 71 is comprised of a case 72 whose top is open and the cantilevered beam portion 71 fixed to a side wall portion 73 firmly. The beam portion 71 is composed of the same zirconia as the insulating portion 3 of each embodiment and produced by sintering integrally with the pressure sensing body 10.

Further, a substantially semi-spherical pressure receiving body 75 is provided on a top face of a free end 71 of the beam portion 71.

The electrode 2 is provided on both ends of the pressure sensing body 10 and a lead wire (not shown) is connected thereto.

Because in this case, the beam portion 71 having the cantilevered beam structure contains the pressure sensing body 10, if a load is applied to the free end of the beam, the beam is deflected, so that a stress is applied to the pressure sensing body 10. That is, the load can be measured according to the deflection of the beam.

Example 16

Figure 12:
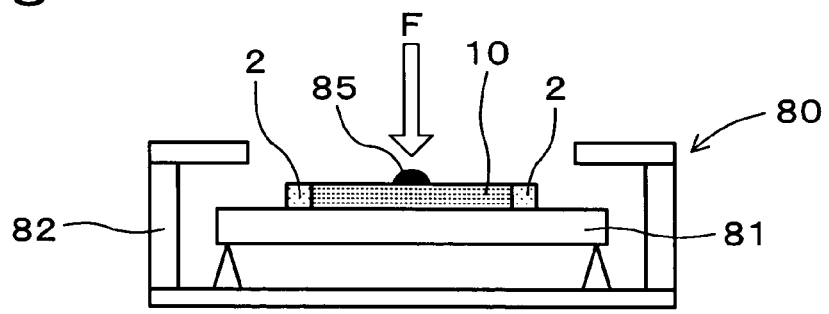
FIG. 12 is an explanatory diagram showing the structure of the load sensor device according to an embodiment 16.

As shown in FIG. 12, this embodiment comprises a dual-point supported beam structure 80 in which both ends of electrical insulation beam portion 81 is supported and a pressure sensing body 10 disposed integrally with part of the beam portion 81, so that a uniaxial load is received by the central portion of the beam portion 81.

Like the embodiment 8, the pressure sensing body 10 is composed of composite material produced by dispersing the material 12 having pressure resistance effect on a matrix made of electrical insulation ceramic material 11 as shown in FIG. 4.

As shown in FIG. 12, the beam structure 80 comprises a case 82 whose top is open and the dual-point supported beam 81 disposed on two supporting portions 84 from the drawer bottom portion 83. The beam portion 81 is composed of the same zirconia as the insulating portion 3 according to each embodiment and produced by sintering integrally with the pressure sensing body 10.

A substantially semi-spherical pressure receiving body 85 for receiving a load is provided on a central portion of the beam portion 81, more specifically, on a top face of the central portion of the pressure sensing portion 10 disposed integrally with the beam portion 81.

Further, the electrodes 2 are provided on both ends of the pressure sensing body 10 and a lead wire (not shown) is connected thereto.

In this case, because the pressure sensing body 10 is provided on the beam portion 81 having the dual-point supported beam structure, if a load is applied to the central portion of the beam, the beam is deformed, so that a stress is applied to the pressure sensing body 10. That is, the load can be measured according to the deflection of the beam.

Embodiment 17

Figure 13:
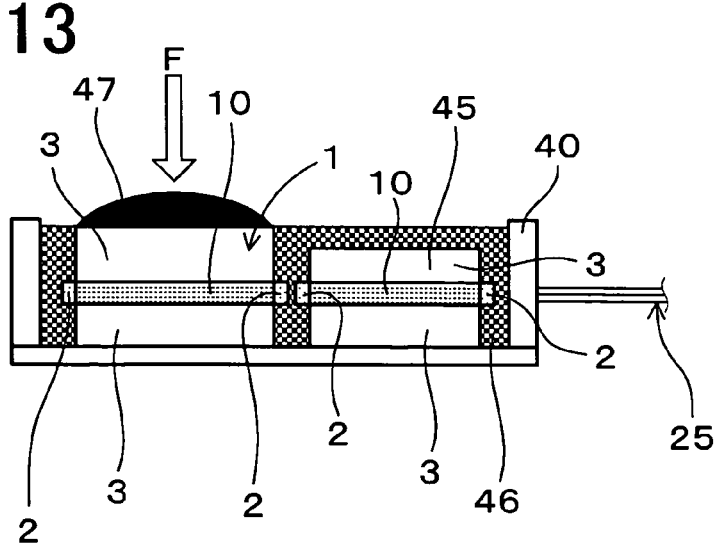
FIG. 13 is an explanatory diagram showing the structure of the load sensor device according to an embodiment 17.

According to this embodiment, as shown in FIG. 13, the load cell is structured using the load sensor device 1 of the embodiment 9.

As indicated in the same Figure, the load sensor device 1 is disposed within a case 40 and a temperature compensation dummy device 45 (the same device as the load sensor device) is disposed nearby and buried with silicone rubber 46.

A semi-spherical pressure receiving body 47 is disposed on a top face of the insulating portion 3 at a upper portion of the load sensor device 1. The dummy device 45 is so structured that the pressure sensing body 10 is sandwiched by two insulating portions 3 like the load sensor device 1. The electrodes 2 are disposed on each pressure sensing body 10 of the load sensor device 1 and the dummy device 45 and then, plural lead wires 25 are connected thereto.

Using the load cell of this embodiment enables a temperature compensation circuit to be formed by an existence of the dummy device thereby load measuring accuracy being improved for a case where temperature change is large. Additionally, the same operation and effect as the embodiment 8 can be obtained.

Embodiment 18

The acceleration sensor device according to this embodiment of the present invention will be described with reference to FIGS. 14a, 14b and 14c.

Figure 14A:
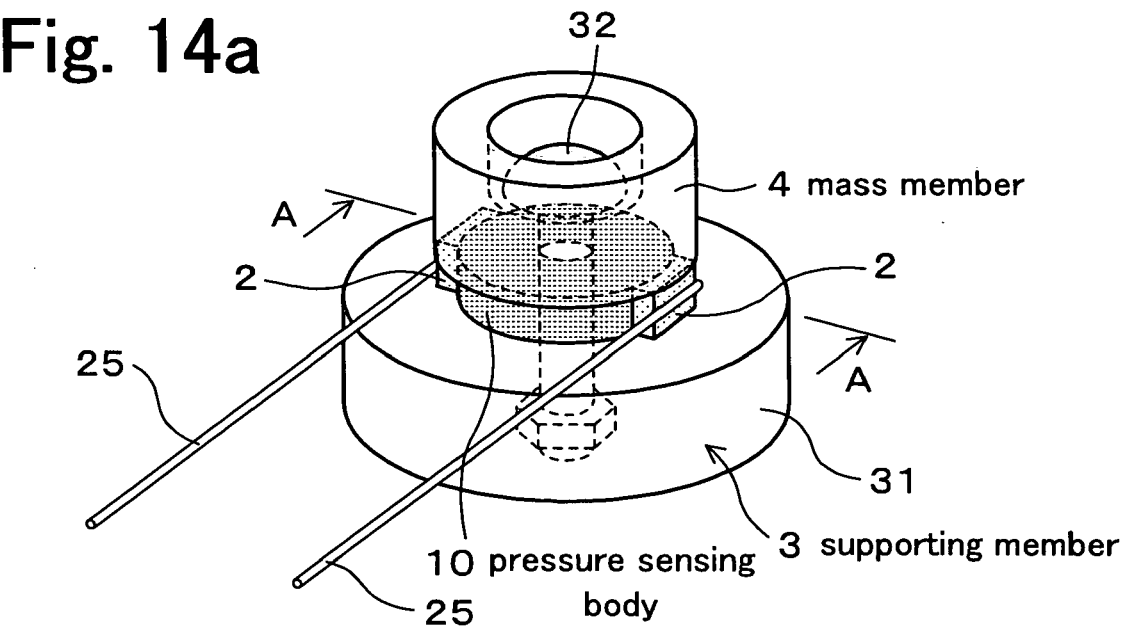
FIG. 14a is a perspective view showing the structure of an acceleration sensor device according to an embodiment 18.
Figure 14B:
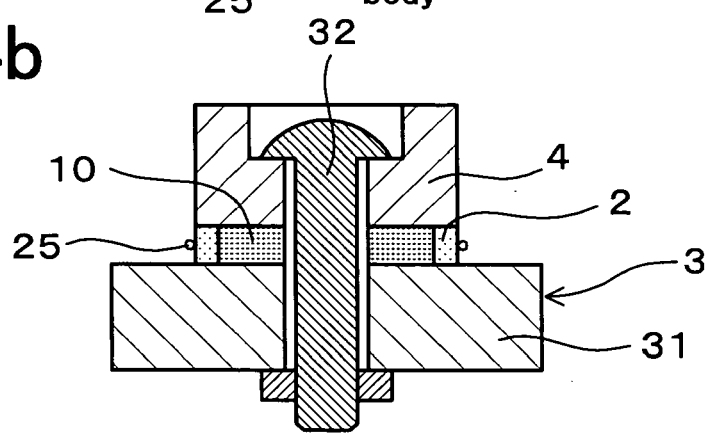
Figure 14C:
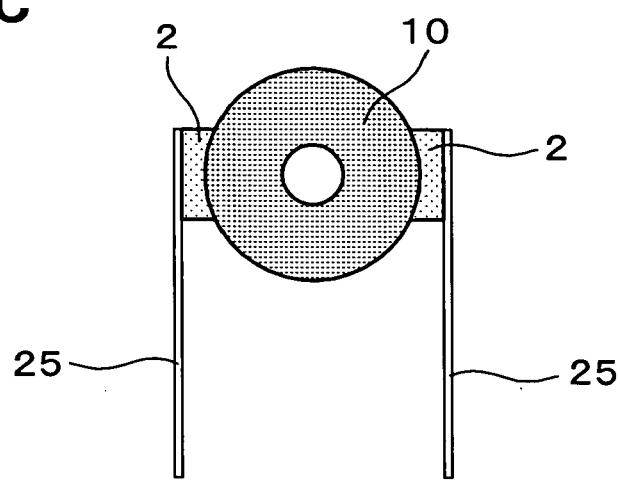
FIG. 14c is a plane view of a pressure sensing body according to an embodiment 18.

The acceleration sensor device 1 of this embodiment, as shown in FIGS. 14a, 14b and 14c and the above-described FIG. 4, is comprised of a pressure sensing body 10 composed of composite material produced by dispersing the material 12 having pressure resistance effect on a matrix made of electrical insulation ceramic material 11, a supporting member 3 for supporting the pressure sensing body 10 and a mass member 4 disposed on the pressure sensing body 10 and for increasing the mass of the pressure sensing body 10.

The pressure sensing body 10 is disposed on the surface of the supporting member 3 such that it is sandwiched by the supporting member 3 and the mass member 4. Then, the pressure sensing body 10 and the mass member 4 are so constructed to be pressed against the supporting member 3 when an acceleration to be measured is applied.

As shown in FIGS. 14a and 14b, the supporting member 3 is comprised of a disc like base portion 31, a bolt 32 screwed therein and a nut 33. The base portion 31 is formed of $ZrO_2$ while the bolt 32 and the nut 33 are formed of metal (SUS304). To maintain insulation characteristic of the pressure sensing body 10, the outside diameter of the bolt 32 is made smaller than the inside diameter of the pressure sensing body 10 so as to avoid a contact between the pressure sensing body 10 and the bolt 32.

As indicated by FIG. 14c, the pressure sensing body 10 of this embodiment is ring-like and the electrode 2 and the lead wire 25 are disposed on its side face.

As shown in FIGS. 14a and 14b, the ring-like mass member 4 is disposed on a top face of the pressure sensing body 10. This mass member 4 is formed of $ZrO_2$.

Here, the pressure sensing body 10 of this embodiment is composed of composite material having the above-described structure. More specifically, a matrix is formed using electrical insulation ceramic material 11 and the material 12 having pressure resistance effect is dispersed therein (see FIG. 4). Then, the pressure resistance effect materials 12 are disposed such that they are electrically continued. Meanwhile, as indicated in the same Figure, some pressure resistance effect materials 12 are isolated so that they are not continuous with other pressure resistance effect materials 12.

The pressure sensing body 10 is manufactured of such composite material as follows.

As the electrical insulation ceramic material 11, 12 mol % $CeO_2$ added $ZrO_2$ is employed and as the pressure resistance effect material 12, $La_{0.75}Sr_{0.25}MnO_3$ is employed.

First, the $La_2O_3$ powder, $SrCO_3$ powder, and $MnCO_3$ powder were weighed such that the composition ratio of La:Sr:Mn was 0.75:0.25:1. These powders were poured into a polyethylene pot together with mixing $ZrO_2$ ball and mixing solvent ethanol and mixed for 20 hours.

The mixing powders were dried and crushed and then, baked temporarily at 1300° C. for four hours in the atmosphere so as to synthesize perovskite complex oxide powder $La_{0.75}Sr_{0.25}MnO_3$ having pressure resistance effect.

Subsequently, $ZrO_2$ powder (Sumitomo Osaka Cement Co., Ltd., OZC-12CEB) containing an addition of $CeO_2$ and synthesized $La_{0.75}Sr_{0.25}MnO_3$ powder were weighed such that the weight ratio of $La_{0.75}Sr_{0.25}MnO_3$ with respect to total weight was 26 weight %.

Those powders were poured into a polyethylene pot together with mixing $ZrO_2$ ball and mixing solvent ethanol and mixed for four hours, and then dried and crushed. The crushed mixing powders were press-formed into a disc shape of 18 mm in diameter with a mold and subjected to CIP processing under a pressure of 3000 kg/cm². Then, these were sintered at 1400° C. for four hours.

The density of an obtained sintered body is as fine as 98% and has electrical conductivity. The specific resistance of the sintered body was about 25 Ωcm.

The pressure sensing body 10 is obtained by cutting this sintered body to a ring-like shape.

The pressure sensing body 10 has the electrode 2 as described above.

The electrode 2 was baked with Ag paste (Shoei Chemical Inc., H-5997) at 850° C. for 10 minutes. The lead wire 25 was disposed on the electrode 2 by soldering.

This pressure sensing body 10 was placed on the base portion 31 as shown in FIGS. 14a and 14b. Then, the mass member 4 was placed thereon and a bolt 35 was inserted into these so as to obtain the load sensor device 1 of this embodiment.

Next, the operation and effect of this embodiment will be described.

The pressure sensing body 10 of this embodiment adopts the special composite material having the above-described structure.

That is, the material constituting the pressure sensing body 10 is composed of composite material obtained by dispersing the material 12 having the pressure resistance effect on a matrix made of electrical insulation ceramic material 11. Because the electrical insulation ceramic material 11 constituting the above-described matrix has a high compression strength, the strength of the entire sensor device can be intensified. For the reason, a structure in which the composite material itself receives a high acceleration (inertial force) directly can be realized.

Further, the above-described pressure resistance effect material 12 is dispersed in the matrix. Thus, a conductive path is formed in the matrix such that the pressure resistance effect materials 12 are continuous, so that pressure resistance effect can be obtained by a pressure generated when an acceleration is received.

According to this embodiment, the mass member 4 was disposed in the pressure sensing body 10. Consequently, the inertial force which the pressure sensing body 10 receives is increased by the mass of the mass member 4, so that the sensitivity of the pressure sensing body 10 can be increased. For the reason, measuring accuracy of the acceleration can be improved.

In the acceleration sensor device 1 of this embodiment, the pressure sensing body 10 is disposed on the surface of the supporting member 3 such that it is sandwiched by the supporting member 3 and the mass member 4. The pressure sensing body 10 and the mass member 4 are so constructed to be pressed by the supporting member 3 when an acceleration to be measured is applied.

Consequently, a structure for receiving an acceleration (inertial force) directly in the pressure sensing body 10 is formed, and this structure is simple and difficult to destroy.

Embodiment 19

Figure 15:
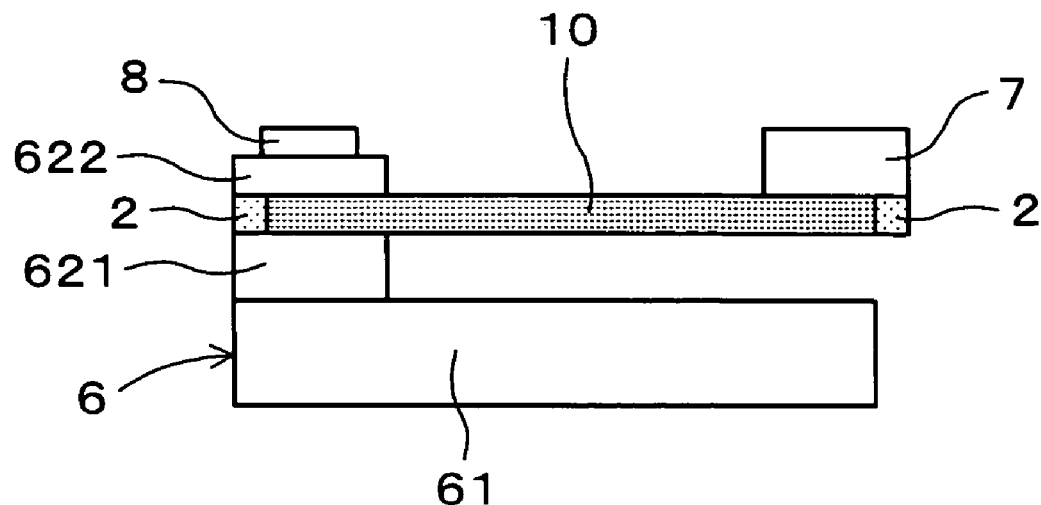
FIG. 15 is an explanatory diagram showing the structure of the acceleration sensor device according to an embodiment 19.

According to this embodiment, as shown in FIG. 15, the pressure sensing body 10 is structured in the form of a beam supported like a cantilever by the supporting member 6 and the mass member 7 is held at its free end.

As shown in the same Figure, the supporting member 6 is comprised of a base portion 61 and a beam fixing portion 62 provided at an end side of the base portion 61. The beam fixing portion 62 is comprised of lower plate portion 621 and upper plate portion 622 for nipping the beam portion and a bolt portion 8 which passes through these components and screwed therein.

The pressure sensing body 10 constituting the beam portion is composed of composite material produced in the same manner as the embodiment 18 and the electrode 2 and the lead wire (not shown) are disposed on its both ends. The mass member 7 composed of $ZrO_2$ was connected to the free end of the beam portion.

Electrical insulation $ZrO_2$ was used for the base portion 61 of the supporting member 6 and the lower plate portion 621 and the upper plate portion 622. The bolt portion 8 was composed of metal (SUS304) and structured not so as to touch the pressure sensing body 10 directly.

When the acceleration (inertial force) is applied, the beam portion is deformed due to an existence of the mass member 7 disposed at a front end of the cantilevered beam structure, so that a stress is applied to the pressure sensing body 10. That is, the acceleration can be measured according to the deformation of the beam.

With this structure, a corresponding acceleration can be selected easily by changing the structure design of the cantilevered structure in various ways. Consequently, an acceleration sensor device for a small acceleration and an acceleration sensor for a large acceleration can be produced.

Embodiment 20

Figure 16:
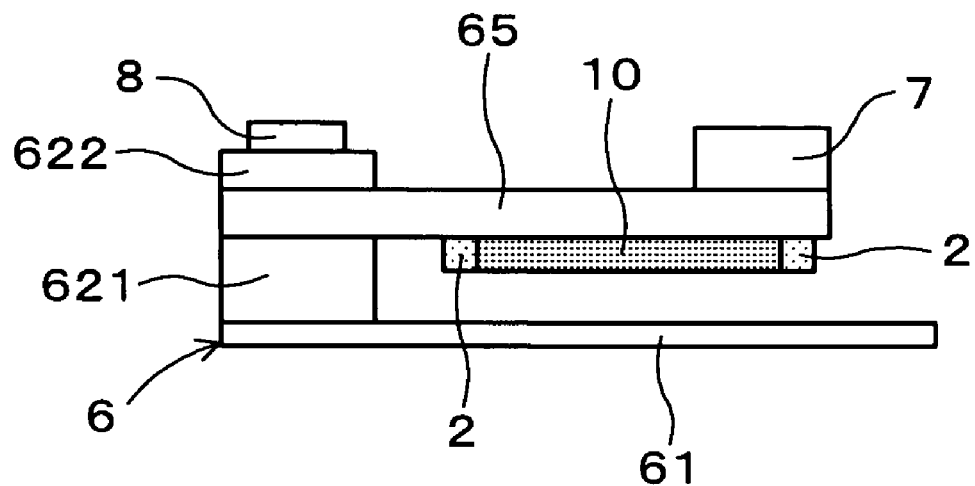
FIG. 16 is an explanatory diagram showing the structure of the acceleration sensor device according to an embodiment 20.

According to this embodiment, as shown in FIG. 16, the beam portion constituted of the pressure sensing body 10 of the embodiment 19 is changed to a beam portion 65 composed of insulation member and the pressure sensing body 10 is disposed at the beam portion 65.

The pressure sensing body 10 was produced like the embodiment 18 and disposed in the central portion of the beam portion 65. The beam portion 65 is composed of zirconia and can be produced by sintering integrally with the pressure sensing body 10.

The mass member 7 similar to the embodiment 19 is bonded to the free end of the beam portion 65. The other matters are the same as the embodiment 19.

In this case, when the acceleration (inertial force) is applied, the beam portion is deformed due to an existence of the mass member 6 disposed at a front end of the beam portion having the cantilevered beam structure, so that a stress is applied to the pressure sensing body 10 disposed in the central portion thereof. For the reason, the acceleration can be measured through deformation of the beam.

In this case also, the magnitude of a corresponding acceleration can be selected easily by changing the structure design of the cantilevered beam structure in various ways. Consequently, an acceleration sensor for a small acceleration and an acceleration sensor for a large acceleration can be manufactured.

In this case, because the beam portion 65 can be composed of material having a higher strength than composite material constituting the pressure sensing body 10, an acceleration sensor device having a wider response range can be obtained.

Embodiment 21

The pressure sensor device according to the embodiment of the present invention will be described with reference to FIGS. 17a and 17b.

Figure 17A:
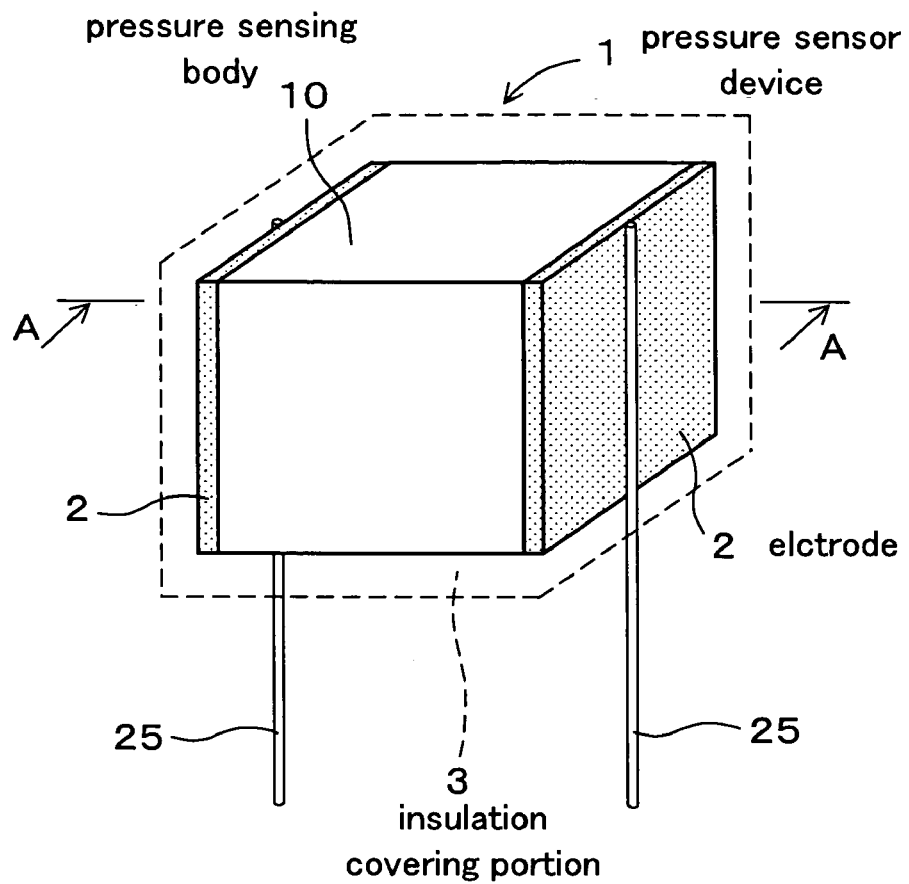
FIG. 17a is a perspective view showing the structure of the pressure sensor device according to an embodiment 21.
Figure 17B:
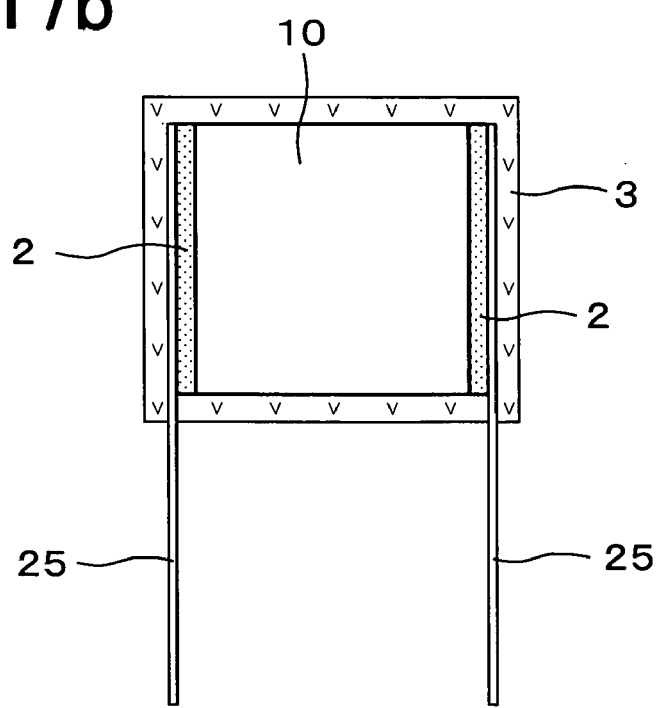

As shown in FIGS. 17a, 17b and 4, the pressure sensor device 1 of this embodiment comprises the pressure sensing body 10 composed of composite material in which the material 12 having the pressure resistance effect is dispersed on a matrix made of the electrical insulation ceramic material 11, a pair of the electrodes 2 disposed on the pressure sensing body 10 and the lead wire 25 disposed on each of the electrodes 2.

According to this embodiment, the shape of the pressure sensing body 10 is substantially cubic and outside surface of pressure sensing body 10 is covered with an insulation covering portion 3.

As described above, the pressure sensing body 10 is composed of composite material having the specific structure. More specifically, the matrix is formed using the electrical insulation ceramic material 11 and the material 12 having the pressure resistance effect is dispersed (see FIG. 4). Then, the pressure resistance effect materials 12 are disposed such that they are electrically continuous. As indicated in the same Figure, some pressure resistance effect materials 12 which are isolated and not continuous with other pressure resistance effect materials 12, exist.

The pressure sensing body 10 composed of composite material is produced as follows.

As the electrical insulation ceramic material 11, 12 mol % $CeO_2$ added $ZrO_2$ is employed, and as the pressure resistance effect material 12, $La_{0.75}Sr_{0.25}MnO_3$ is employed.

First, the $La_2O_3$ powder, $SrCO_3$ powder, and $MnCO_3$ powder were weighed such that the composition ratio of La:Sr:Mn was 0.75:0.25:1. These powders were poured into a polyethylene pot together with mixing $ZrO_2$ ball and mixing solvent ethanol and mixed for 20 hours.

The mixing powders were dried and crushed and baked temporarily at 1300° C. for four hours in the atmosphere so as to synthesize perovskite complex oxide powder $La_{0.75}Sr_{0.25}MnO_3$ having pressure resistance effect.

Subsequently, marketed $CeO_2$ added $ZrO_2$ powder (Sumiotmo Osaka Semento Co., Ltd., OZC-12CEB) and synthesized $La_{0.75}Sr_{0.25}MnO_3$ powder were weighed such that the weight ratio of $La_{0.75}Sr_{0.25}MnO_3$ with respect to the entire weight is 26 weight %.

These powders were thrown into a polyethylene pot together with mixing $ZrO_2$ ball, mixing solvent ethanol and mixed for four hours and dried and crushed. The crushed mixing powder was formed by pressing with a mold into a disc shape of 18 mm in diameter and after that, subjected to CIP processing under a pressure of 3000 kg/cm$^2$. Then, the formed body was sintered at 1400° C. for four hours.

An obtained sintered body has a density 98% as fine as its theoretical density and possesses electrical conductivity. The specific resistance of the sintered body is about 25 Ωcm.

The pressure sensing body 10 is obtained by cutting this sintered body into cubic solids. Further, the electrodes 2 were disposed on opposing side faces of the pressure sensing body 10.

The electrode 2 was baked with Ag paste (Shoei Chemical Inc., H-5997) by maintaining it at 850° C. for 10 minutes. A lead wire 25 was disposed on each of the electrodes 2 by soldering.

As shown in FIGS. 17a and 17b, the entire external surface of this pressure sensing body 10 is covered with the insulation covering portion 3.

More specifically, the entire external surface is coated with epoxy resin (Araldite: Nichiban Co., Ltd.) and cured for 12 hours.

Next, the operation and effect of this embodiment will be described.

According to this embodiment, as the pressure sensing body 10, special composite material having the above-described structure is adopted.

That is, the material constituting the pressure sensing body 10 is composed of composite material in which the material 12 having pressure resistance effect is dispersed on a matrix made of electrical insulation ceramic material 11. Then, because the electrical insulation ceramic material 11 constituting that matrix has a high compression strength, the strength of the entire sensor device can be intensified. For the reason, a structure in which the composite material itself receives a high pressure directly can be realized easily.

Further, the pressure resistance effect material 12 is dispersed in the matrix. For the reason, a conductive path is formed in the matrix such that the pressure resistance effect materials 12 are continuous and thus, pressure resistance effect can be obtained by a pressure generated when a pressure is received.

Further, because the external surface of the pressure sensing body 10 is covered with the insulation covering portion 3, there is no problem even if pressure environment to be measured is electrical conductive, so that an accurate pressure measurement is enabled.

Further, because the shape of the pressure sensing body 10 is cubic, manufacturing thereof is easy and when hydrostatic pressure is received, isotropic deformation is generated, thereby its sensitivity being improved.

Embodiment 22

Figure 18A:
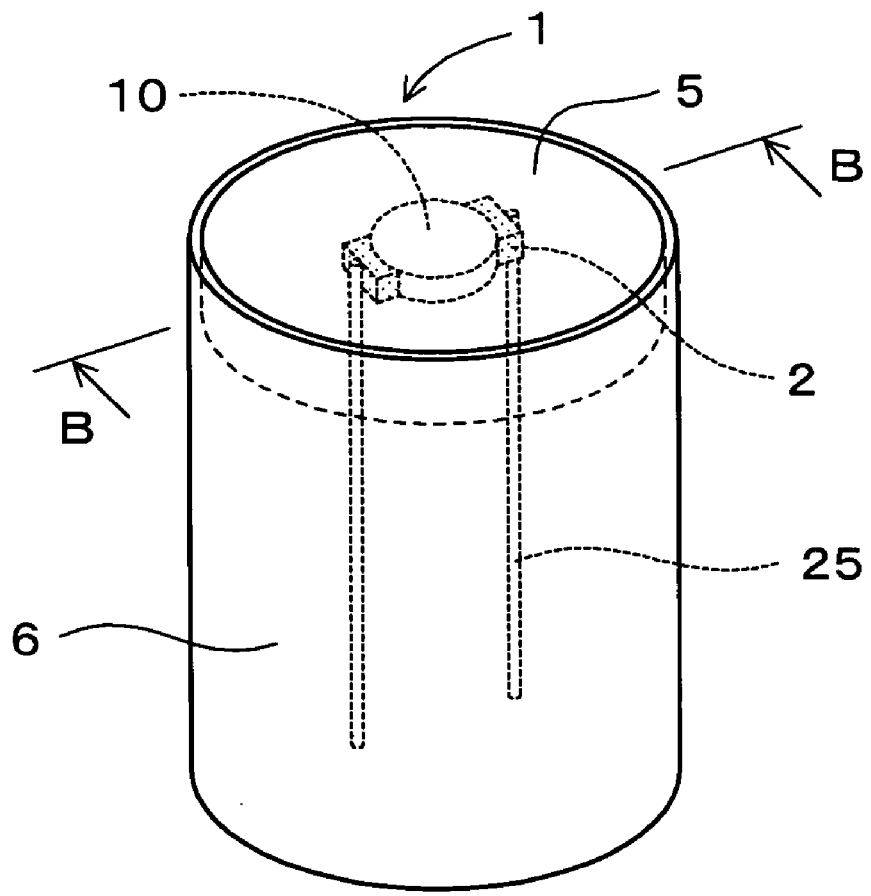
FIG. 18a is a perspective view showing the structure of the pressure sensor device according to an embodiment 22.
Figure 18B:
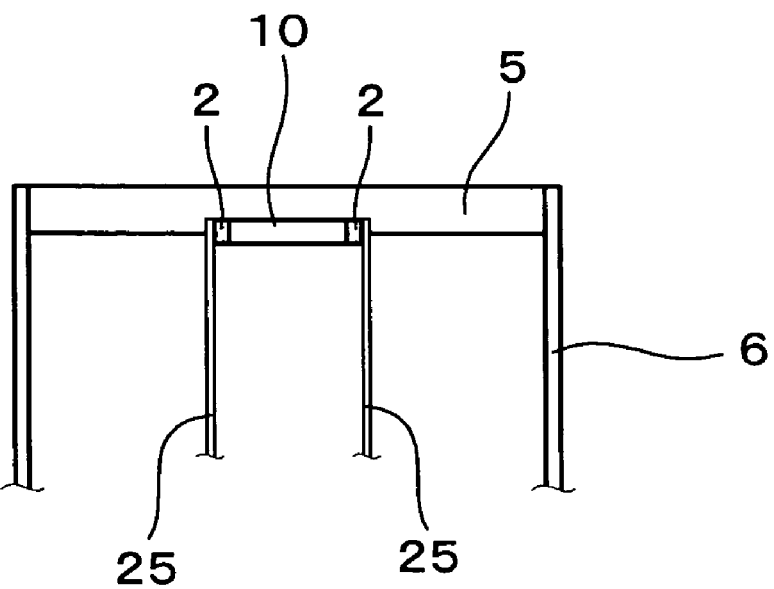

According to this embodiment, as shown in FIGS. 18a and 18b, the pressure sensor device 1 comprises a diaphragm 5 having electrical insulation characteristic, a pressure sensing body 10 disposed integrally on the surface of the diaphragm 5, a pair of electrodes 2 disposed on the pressure sensing body 10 and lead wires 25 disposed on the electrodes 2.

Like the embodiment 21, the pressure sensing body 10 is composed of composite material in which the material 12 having pressure resistance effect is dispersed on a matrix made of electrical insulation ceramic material 11.

According to this embodiment, as the material of the diaphragm 5, 12% Ce added $ZrO_2$ was employed and produced by sintering integrally with the pressure sensing body 10.

More specifically, according to doctor blade method, Ce—$ZrO_2$ sheet having the thickness of 100 $\Omega$m was formed and a disc-like pressure sensing body (26% $La_{0.75}Sr_{0.25}$-74% Ce—$ZrO_2$) was screen-printed on its surface, degreased and sintered so as to produce an integral component of the diaphragm 5 and the pressure sensing body 10.

Then, like the embodiment 21, the electrodes 2 and the lead wires 25 were disposed on both ends of the pressure sensing body 10.

The shape of the diaphragm 5 and the shape of the pressure sensing body 10 were circular. Then, by disposing the diaphragm 5 at a front end of the cylindrical side wall member 6, the pressure sensor device 1 of this embodiment was obtained.

According to this embodiment, composite material having the above-described structure was adopted as the pressure sensing body 10 and disposed integrally on the diaphragm 5. Thus, if the diaphragm is deformed when it receives a pressure to be measured, a stress is generated in the pressure sensing body 10. Thus, the pressure measurement can be carried out easily by measuring the pressure resistance effect of the pressure sensing body 10.

Further, because the pressure sensing body 10 is disposed integrally in a region on the surface of the diaphragm in which a high stress is generated, the sensitivity of the sensor device can be intensified.

Industrial Applicability

As described above, the present invention can provide a load sensor device, an acceleration sensor device and a pressure sensor device, which are dynamic quantity sensor devices capable of measuring a dynamic quantity at a high precision and securing insulation of their pressure sensing bodies easily and having an excellent strength of the pressure sensing bodies and a simple structure.

The invention claimed is:

1. A dynamic quantity sensor device comprising:

a pressure sensing body composed of composite ceramic in which a material having pressure resistance effect is dispersed on a matrix made of electrical insulation ceramic material; and a pressure receiving body having an electrical insulation characteristic and disposed directly on a pressure receiving surface of the pressure sensing body, wherein the pressure sensing body and the pressure receiving body are integrated with each other; and an electrode provided on a surface of said pressure sensing body other than said pressure receiving surface having said pressure receiving body disposed directly thereon.

2. The dynamic quantity sensor device according to claim 1, wherein the pressure receiving body is composed of electrical insulation ceramics.

3. The dynamic quantity sensor device according to claim 1, wherein the pressure receiving body is sintered integrally with the pressure sensing body.

4. The dynamic quantity sensor device according to claim 1, wherein the pressure receiving body is bonded with the pressure sensing body with adhesive agent.

5. The dynamic quantity sensor device according to claim 1, wherein the electrical insulation ceramics constituting the pressure receiving body and the electrical insulation ceramics constituting the pressure sensing body are of the same ceramics.

6. The dynamic quantity sensor device according to claim 1, wherein the electrical insulation ceramics constituting the pressure receiving body and the electrical insulation ceramics constituting the pressure sensing body are zirconia.

7. The dynamic quantity sensor device according to claim 1, wherein the material having the pressure resistance effect is composed of any one or more of perovskite structured $(Ln_{1-x}Ma_x)_{1-y}MbO_{3-z}$, layered perovskite structured $(Ln_{2-u}Ma_{1+u})_{1-v}Mb_2O_{7-w}$, Si and substance produced by adding a small amount of additional element to these (here, $0<x\leq0.5$, $0\leq y\leq0.2$, $0\leq z\leq0.6$, $0<u\leq1.0$, $0\leq v\leq0.2$, $0\leq w\leq1.0$, Ln: rare earth element, Ma: one or more alkaline earth element, Mb: one or more transition metal element).

8. The dynamic quantity sensor device according to claim 1, wherein the material having a pressure resistance effect constituting the pressure sensing body is $La_{1-x}Sr_xMnO_3$ particles ($0<x\leq0.5$).

9. The dynamic quantity sensor device according to claim 1, wherein the pressure receiving body is mixed with the material having pressure resistance effect therewith in a range in which no electrical conductivity is manifested.

10. The dynamic quantity sensor device according to claim 9, wherein the amount of addition of the material having the pressure resistance effect to the pressure receiving body is 5–15%.

11. The dynamic quantity sensor device according to claim 9, wherein the material having the pressure resistance effect which is contained by the pressure receiving body, is composed of any one or more of perovskite structured $(Ln_{1-x}Ma_x)_{1-y}MbO_{3-z}$, layered perovskite structured $(Ln_{2-u}Ma_{1+u})_{1-v}Mb_2O_{7-w}$, Si and substance produced by adding a small amount of additional element to these (here, $0<x\leq0.5$, $0\leq y\leq0.2$, $0\leq z\leq0.6$, $0<u\leq1.0$, $0\leq v\leq0.2$, $0\leq w\leq1.0$, Ln: rare earth element, Ma: one or more alkaline earth element, Mb: one or more transition metal element).

12. The dynamic quantity sensor device according to claim 9, wherein the material having the pressure resistance effect contained by the pressure receiving body is (La, Sr)MnO$_3$ particles.

13. The dynamic quantity sensor device according to claim 1, wherein the dynamic quantity sensor device is a load sensor device capable of measuring a uniaxial load and so constructed that the uniaxial load to be measured is applied directly on the pressure receiving body disposed integrally on the pressure receiving surface of the pressure sensing body.

14. The dynamic quantity sensor device according to claim 13, wherein the pressure sensing body includes an insulating portion having the electrical insulation characteristic so as to cover an entire external surface thereof while at least part of the insulating portion acts as the pressure receiving body at the same time.

15. The dynamic quantity sensor device according to claim 13, wherein a plurality of the pressure sensing bodies are disposed on an insulation substrate having electrical insulation characteristic with an island-like fashion by bonding one pressure receiving surfaces of each one of the pressure sensing body to the insulation substrate, and the other pressure receiving surface of each one of the pressure sensing body has an insulating portion having electrical insulation characteristic while at least part of the insulating portion acts as the pressure receiving body.

16. The dynamic quantity sensor device according claim 13, wherein the shape of the pressure receiving surface is polygonal.

17. The dynamic quantity sensor device according to claim 13, wherein the shape of the pressure receiving surface is a shape formed by combining with curves.

18. The dynamic quantity sensor device according to claim 13, wherein the shape of the pressure receiving surface is ring-like.

19. The dynamic quantity sensor device according to claim 13, wherein the pressure receiving surface of the pressure sensing body has the pressure receiving body of substantially sub-spherical shape.

20. The dynamic quantity sensor device according to claim 14, wherein the insulating portion is composed of zirconia.

* * * * *